(12) United States Patent
Kasin

(10) Patent No.: US 8,808,507 B2
(45) Date of Patent: Aug. 19, 2014

(54) MICROWAVE ASSISTED FLASH PYROLYSIS SYSTEM AND METHOD USING THE SAME

(75) Inventor: Kjell Ivar Kasin, Notodden (NO)

(73) Assignee: Scandinavian Biofuel Company AS, Oslo (NO)

(*) Notice: Subject to any disclaimer, the term of this patent is extended or adjusted under 35 U.S.C. 154(b) by 585 days.

(21) Appl. No.: 13/196,842

(22) Filed: Aug. 2, 2011

(65) Prior Publication Data

US 2013/0032464 A1    Feb. 7, 2013

(51) Int. Cl.
C10B 19/00 (2006.01)
C10B 7/06 (2006.01)
C10B 57/18 (2006.01)
C10B 53/02 (2006.01)
C10K 3/02 (2006.01)

(52) U.S. Cl.
CPC .......... C10B 19/00 (2013.01); C10B 57/18 (2013.01); Y02E 50/14 (2013.01); C10B 53/02 (2013.01); C10K 3/02 (2013.01)
USPC ............... 201/19; 202/96; 202/117; 422/186

(58) Field of Classification Search
CPC ........... C10B 19/00; C10B 1/10; C10B 7/06; C10B 53/02; C10B 53/07; B01J 19/126
USPC ............. 201/19; 202/96, 99, 100, 105, 117; 48/65; 422/186, 186.29; 219/700, 701
See application file for complete search history.

(56) References Cited

U.S. PATENT DOCUMENTS

| | | | | |
|---|---|---|---|---|
| 3,449,213 A | * | 6/1969 | Ellis, Jr. et al. | 201/19 |
| 3,843,457 A | * | 10/1974 | Grannen et al. | 201/19 |
| 4,065,361 A | * | 12/1977 | Hanson | 201/19 |
| 6,133,500 A | * | 10/2000 | Emery | 422/186 |
| 2009/0000938 A1 | * | 1/2009 | Kasin | 201/19 |
| 2011/0036706 A1 | * | 2/2011 | Van Thorre et al. | 422/186.29 |

* cited by examiner

Primary Examiner — Jill Warden
Assistant Examiner — Joye L Woodard
(74) Attorney, Agent, or Firm — Chun-Ming Shih

(57) ABSTRACT

The present invention provides a microwave assisted flash pyrolysis system to carry out microwave assisted flash pyrolysis in an industrial scale. The microwave assisted flash pyrolysis system comprises at least one microwave generator; a chamber comprises: at least one feedstock inlet, at least one baffle plate, a microwave-transparent rotating window, and at least one microwave inlet, at least one wet gas outlet, and at least one dry end product outlet. The present invention also provides a method using the same system to carry out microwave assisted flash pyrolysis.

12 Claims, 62 Drawing Sheets

MICROWAVE ASSISTED FLASH PYROLYSIS SYSTEM AND METHOD USING THE SAME

TECHNICAL FIELD OF THE INVENTION

The invention relates to a microwave assisted flash pyrolysis to waste or biomass to reclaim matter or energy from that waste or biomass.

BACKGROUND OF THE INVENTION

The recycling of different materials and the conversion of the energy contents of waste or biomass becomes ever more relevant and the target of large scale investments, private as well as public. The procedure used normally is to pre-sort those materials found in the municipal waste, which may be recycled. What remains are materials that may be converted into energy through, for example, incineration.

The problem of waste accumulation grows steadily. It is expensive both in terms of collection costs and fees charged, and it is particularly unacceptable in terms of the valuable resources that are wasted.

Incineration is a common method for retrieving energy from waste that cannot be recycled. The energy is usually converted into heat in the form of hot water or steam that subsequently may replace "nobler" forms of energy.

Hierarchically, electricity in the form of alternating current is the most valuable form of energy, as it may, at low cost, be converted into practically any other form of energy.

The cost of converting the energy contents of waste into electric power through incineration is, however, very high, usually requiring large plants if conversion is to yield a good financial return. The high costs are the result particularly of very strict public regulations regarding the release of polluting emissions into the atmosphere.

Pyrolysis is known traditionally as the conventional retort dry distillation process utilizing an external source of heat, sometimes combined with partial combustion of the contents in the retort. Examples of such processes are the production of wood-tar/charcoal and coke from wood and coals respectively. In modern plants, pyrolysis may be best known as what the petrochemical industry refers to as "cracking."

Even after the invention of the magnetron in 1921, which used radio tubes to create the microwaves (MW), it took a quarter of a century before MW generators reached the market and came into practical use. In the post-WWII period, MW processes have found multiple applications within industries and in private households.

SUMMARY OF THE INVENTION

The present invention provides a system to carry out microwave assisted rapid or "flash" pyrolysis in an industrial scale. The present invention provides a microwave-assisted flash pyrolysis system, comprising at least one microwave generator connected to a chamber. The chamber comprises: at least one feedstock inlet, at least one baffle plate, a microwave-transparent rotating window, and at least one microwave inlet, at least one wet gas outlet, and at least one dry-end product outlet. In addition, the feedstock inlet for introducing feedstocks to the microwave-transparent rotating window is disposed over the microwave-transparent rotating window and in front of the first baffle plate. The first baffle plate is used for leveling out the feedstocks on the microwave-transparent rotating window and separating the chamber into different pyrolysis sectors in which flash pyrolysis is to take place. In some embodiments, the microwave-assisted flash pyrolysis system could comprise more than one baffle plate (hereinafter the "first baffle plate" and "second baffle plate"). If the system has more than one baffle plates, the second baffle plate could further defining the pyrolysis sector together with the first baffle plate. The baffle plates (first and second baffle plate) are disposed over the microwave-transparent rotating window, and there is a gap between the first baffle plate and microwave-transparent rotating window. The height of the gap is adjustable and used for determining the thickness of input feedstocks.

The microwave-transparent rotating window moves the input feedstocks through the gap and into the pyrolysis sector. The pyrolysis sector is disposed over the microwave inlet. The microwave inlet is connected to the microwave generator for introducing microwave energy upward into the pyrolysis sector that is disposed over the microwave-transparent rotating window and limiting the microwave energy between the first baffle plate and the dry-end product outlet (or the second baffle plate). The wet gas outlet is connected to a gas collection unit for collecting wet pyrolysis gas from the pyrolysis sector, and the wet gas outlet is disposed over the microwave-transparent rotating window. The dry-end product outlet is connected to the chamber for collecting pyrolyzed dry-end products from the microwave-transparent rotating window. The atmosphere inside the chamber consists of an inert atmosphere, and no oxygen is added to the chamber.

For operating the microwave assisted pyrolysis system of the present invention, a method for flash-pyrolyzing a feedstock by using such microwave assisted pyrolysis system is provided. The method comprises: introducing a feedstock through a feedstock inlet into a chamber; letting a microwave-transparent rotating window to move the feedstock through a gap into a pyrolysis sector; pyrolyzing the feedstock by an upward direction of microwave energy through the microwave-transparent rotating window coming from a microwave inlet, wherein a wet pyrolysis gas and a pyrolyzed dry-end product will be produced by a flash pyrolysis process; collecting the wet pyrolysis gas by a gas collection unit through a wet gas outlet; and transporting the pyrolyzed dry-end product to a dry-end product outlet; wherein the pyrolyzed dry-end product is transported out of the chamber.

Through the present invention, a microwave pyrolysis system must have a stronger microwave energy zone compared to an ordinary microwave pyrolysis so that microwave assisted flash pyrolysis can be well carried out. The pyrolysis gas generated from a microwave assisted flash pyrolysis system of the present invention can contain less carbon hydrides.

Next, the details of the embodiments of the present invention will be given.

DETAILED DESCRIPTION OF THE INVENTION

Figure 1A:
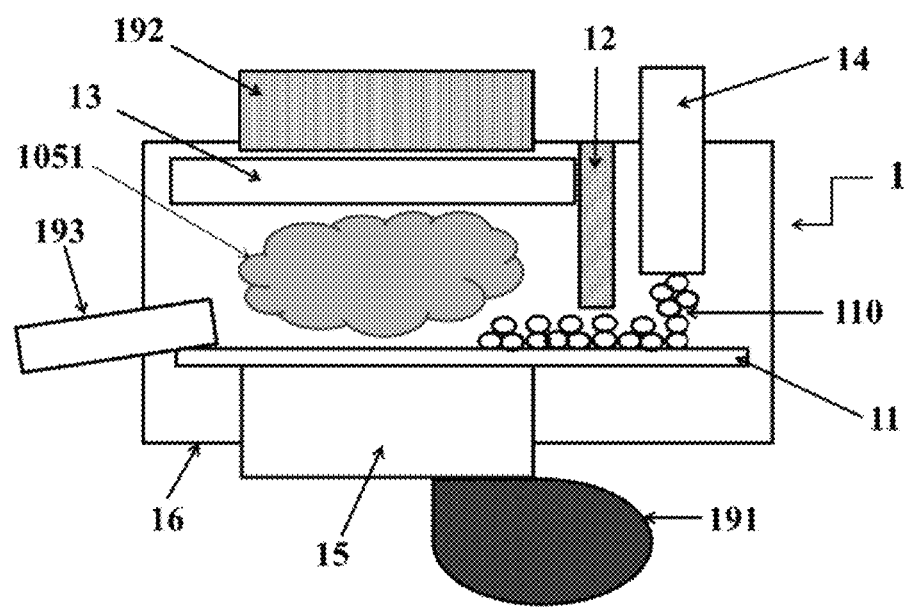
FIGS. 1(*a*), 1(*b*) and 1(*c*) show some embodiments of the present invention.
Figure 1B:
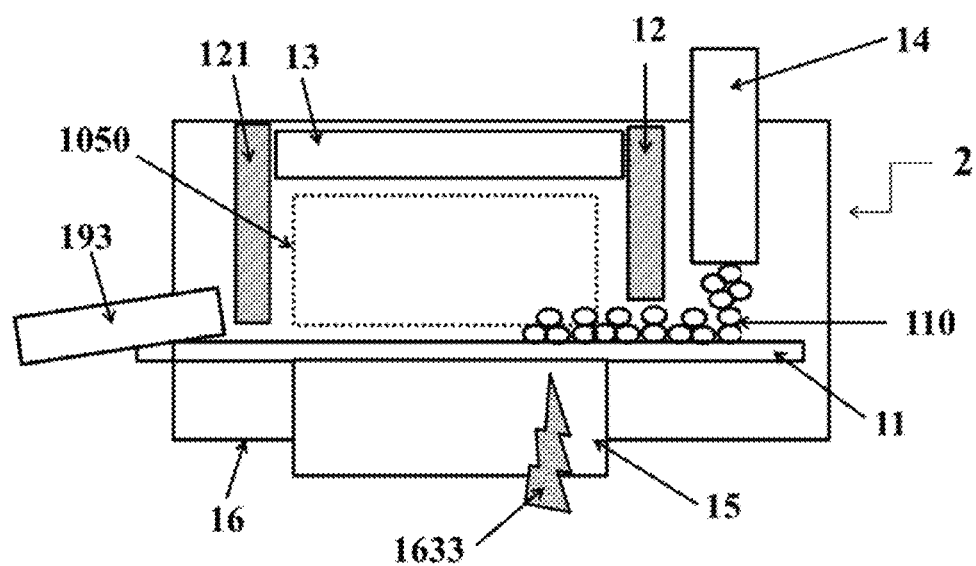
Figure 1C:
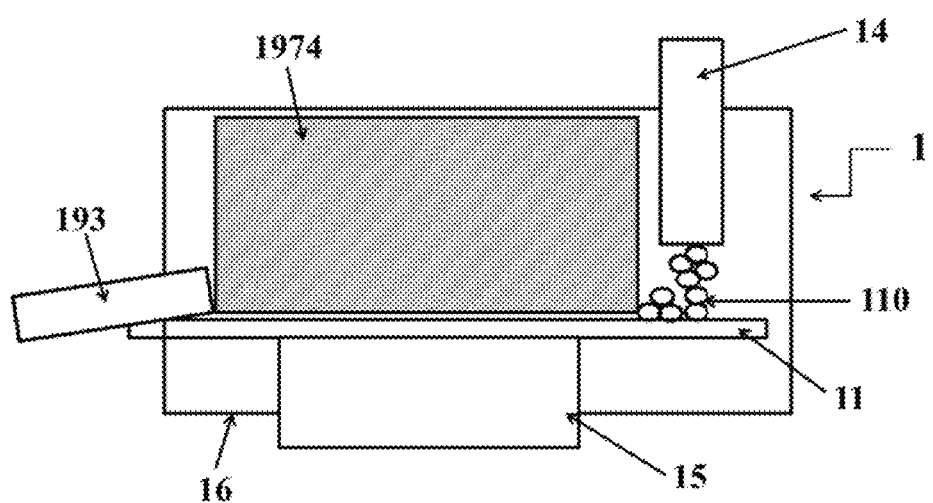

The present invention provides a microwave assisted flash pyrolysis system 1 as shown in FIG. 1(*a*). The microwave assisted flash pyrolysis system 1 comprises at least one microwave generator 191 and a chamber 16. The chamber 16 comprises: at least one feedstock inlet 14, at least one first baffle plate 12, a microwave-transparent rotating window 11, and at least one microwave inlet 15, at least one wet gas outlet 192, and at least one dry-end product outlet 193.

As shown in FIG. 1(*a*), the feedstock inlet 14 is used for introducing feedstocks 110 to the microwave-transparent rotating window 11, and the feedstock inlet 14 is disposed over the microwave-transparent rotating window 11 and in front of the first baffle plate 12.

Figure 24:
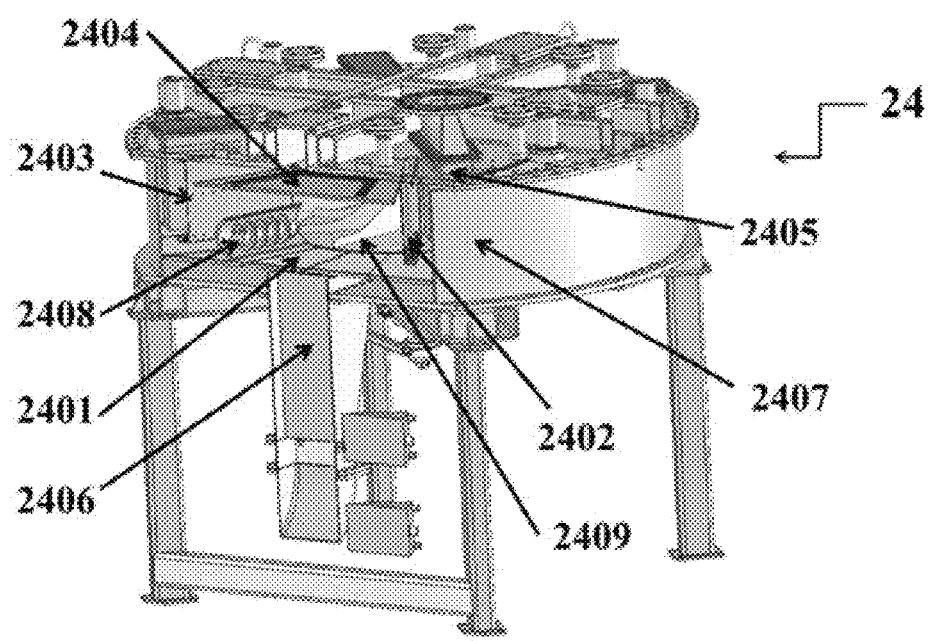
FIG. 24 shows one embodiment of the present invention.
Figure 26:
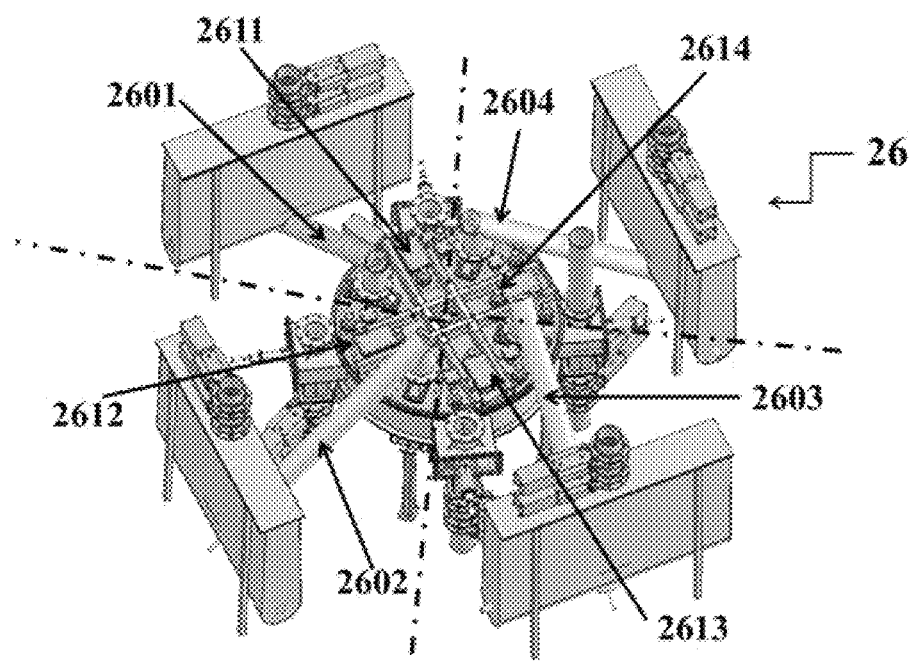
FIG. 26 shows one embodiment of the present invention.

The first baffle plate 12 is used for leveling out the feedstocks 110 on the microwave-transparent rotating window 11. As shown in FIGS. 24 and 26, the first baffle plate 2402 is used for separating the chamber 2407 into different pyrolysis sectors 2611, 2612, 2613 and 2614 in which flash pyrolysis is to take place.

As shown in FIG. 1(*a*), the first baffle plate 12 is disposed over the microwave-transparent rotating window 11, and there is a gap 801 (as shown in FIG. 8(*a*)) between the first baffle plate 12 and microwave-transparent rotating window 11. The height of the gap 801 is adjustable, and the height value is used for determining the thickness of input feedstocks 110.

Figure 5A:
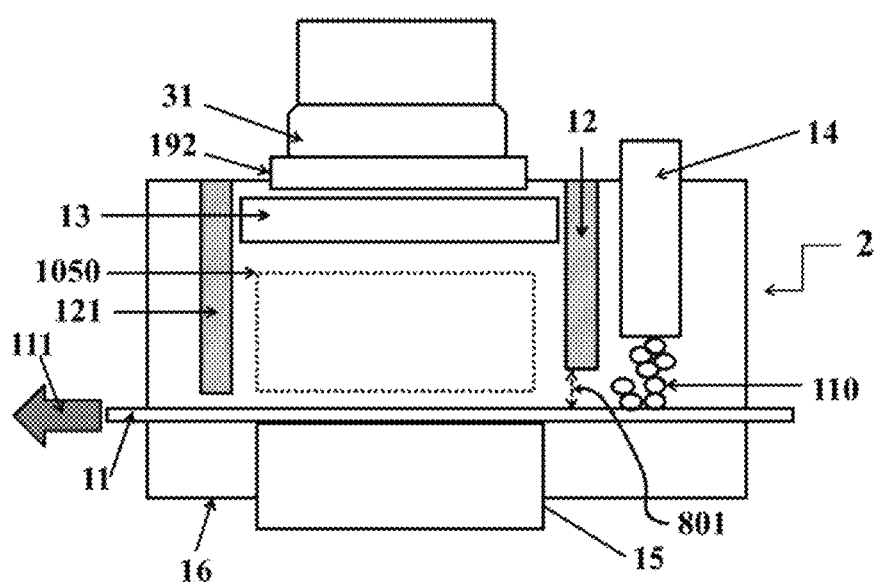
FIGS. 5(*a*), 5(*b*) and 5(*c*) show side views that how a microwave-transparent rotating window is operating for some embodiments of the present invention.
Figure 5B:
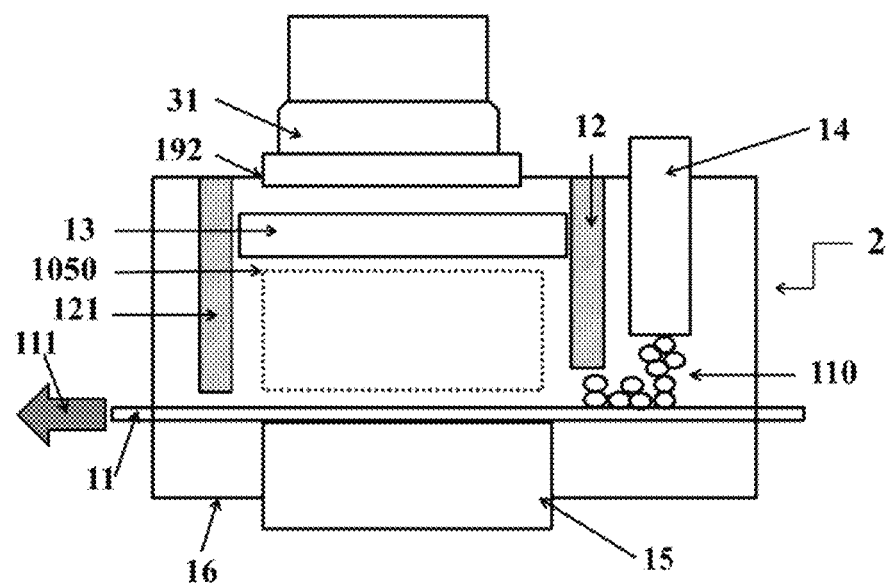
Figure 5C:
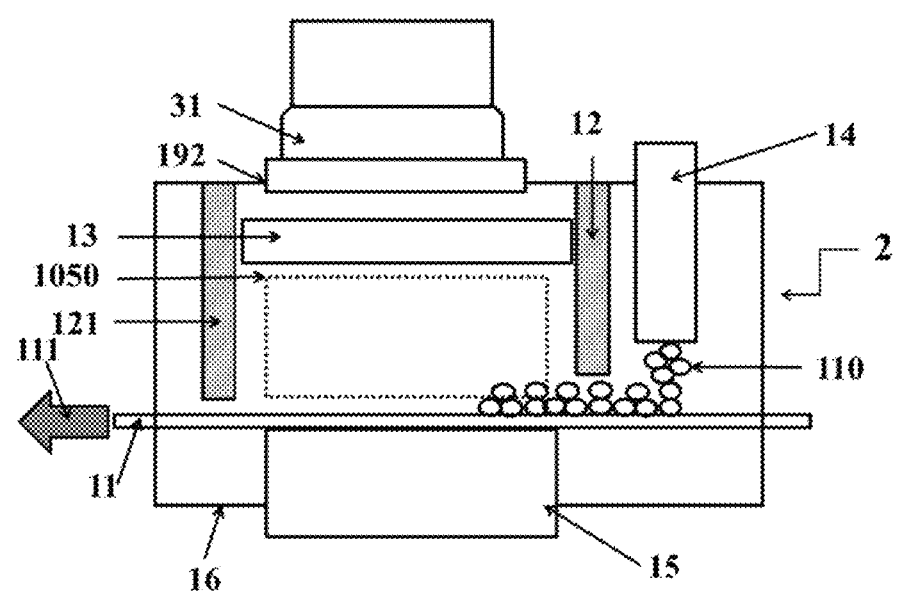

Please refer to FIGS. 5(*a*), 5(*b*) and 5(*c*), where the microwave-transparent rotating window 11 moves the input feedstocks 110 through the gap 801. The microwave-transparent rotating window 11 conveys the feedstocks 110 into the pyrolysis sector 1050. In addition, the pyrolysis sector 1050 will be formed over the microwave inlet 15.

Please refer to FIG. 1(*a*) again. The microwave inlet 15 is connected to the microwave generator 191, and is used for introducing microwave energy upward (flash arrow 1633, as shown in FIG. 1(*b*)) into the pyrolysis sector 1050 that is disposed over the microwave-transparent rotating window 11. The microwave energy 1051 could be limited between the first baffle plate 12 and the dry-end product outlet 193, as shown in FIG. 1(*a*).

Figure 4:
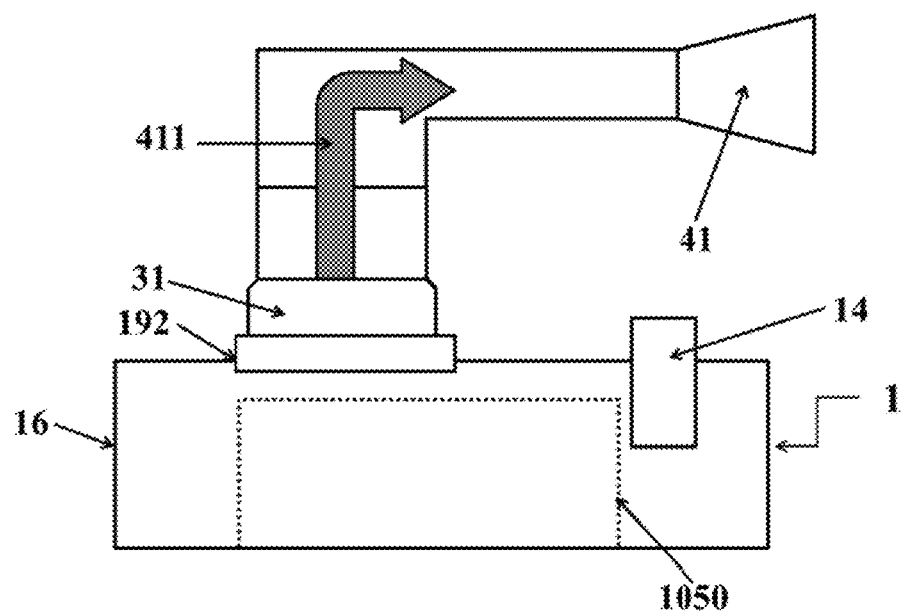
FIG. 4 shows a path of pyrolysis gas leaving the chamber for some embodiments of the present invention.

Please refer to FIG. 4, where the wet gas outlet 192 is connected to a gas collection unit 41 for collecting wet gas from the pyrolysis sector 1050. Please refer to FIG. 1 again. The wet gas outlet 192 is disposed over the microwave-transparent rotating window 11.

It should be noted that in some embodiments, the atmosphere inside the chamber 16 consists of an inert atmosphere, and no oxygen is added to the chamber 16.

Figure 2A:
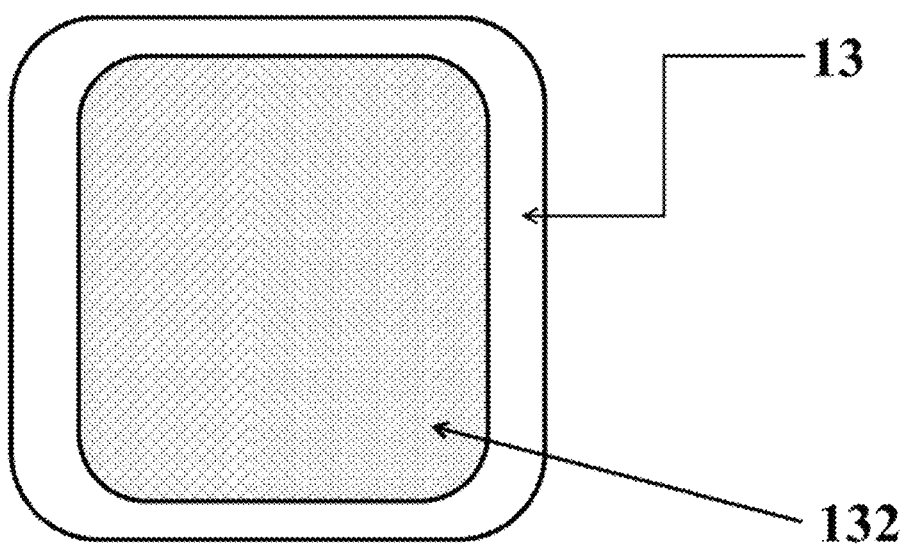
FIGS. 2(*a*) and 2(*b*) show tuning structures of some embodiments of the present invention.
Figure 2B:
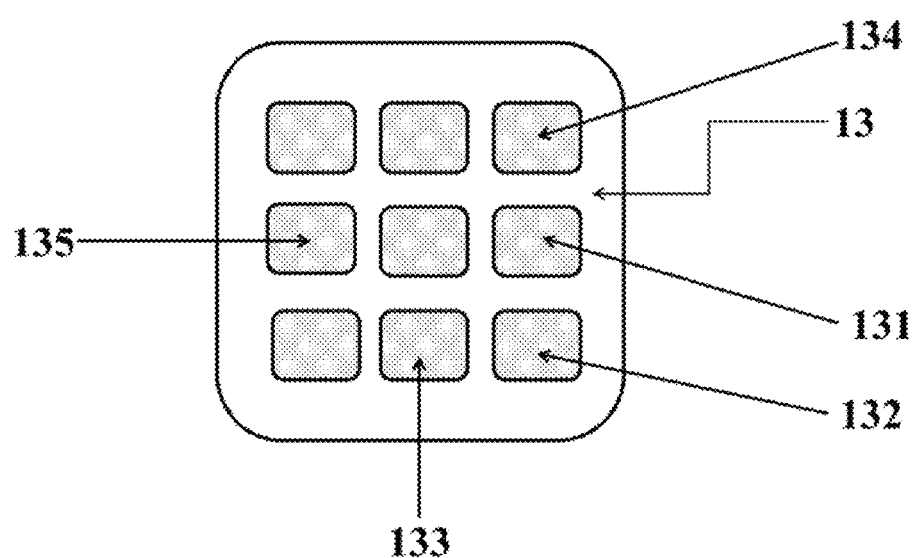

In other embodiments, as shown in FIG. 1(*b*), the microwave assisted flash pyrolysis system 2 could further have another baffle plate, such as a second baffle plate 121. Said second baffle plate 121 could work with the first baffle plate 12 to further define the pyrolysis sector 1050. The second baffle plate 121 is disposed over the microwave-transparent rotating window 11 and between the first baffle plate 12 and the dry-end product outlet 193. The tuning plate 13 shown in FIGS. 1(*a*) and 1(*b*) has at least one hole 132, as shown in FIG. 2(*a*). Alternatively, the tuning plate 13 may has many holes 131, 132, 133, 134, 135, as shown in FIG. 2(*b*). The hole 132 is designed to free the wet pyrolysis gas generated during the microwave assisted flash pyrolysis.

Figure 3A:
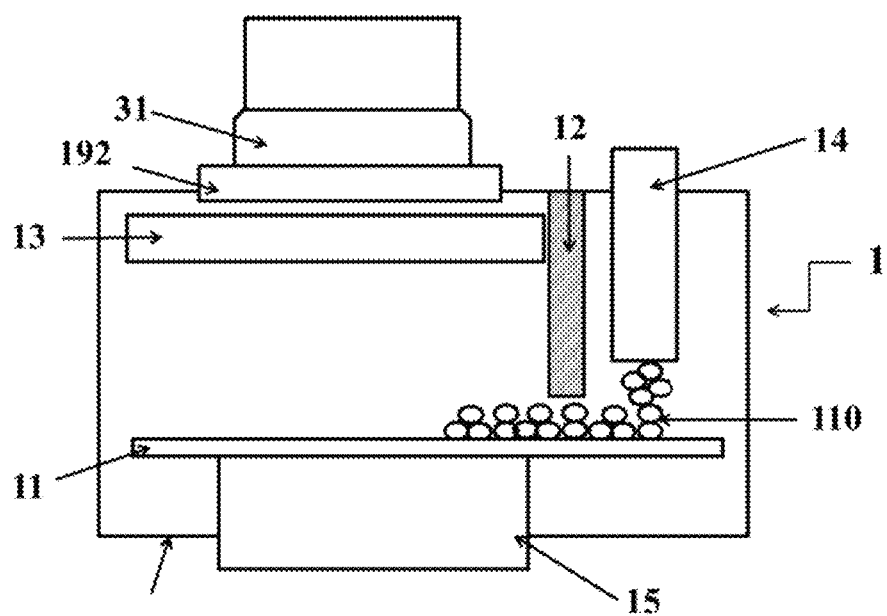
FIGS. 3(*a*), 3(*b*), and 3(*c*) show gas collector structures of some embodiments of the present invention.
Figure 3B:
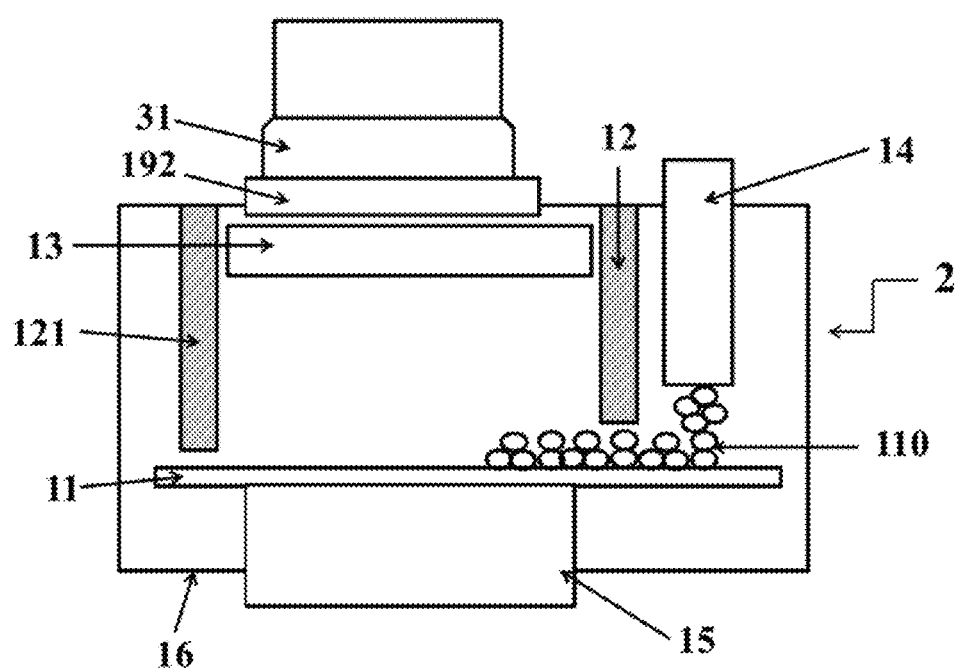
Figure 3C:
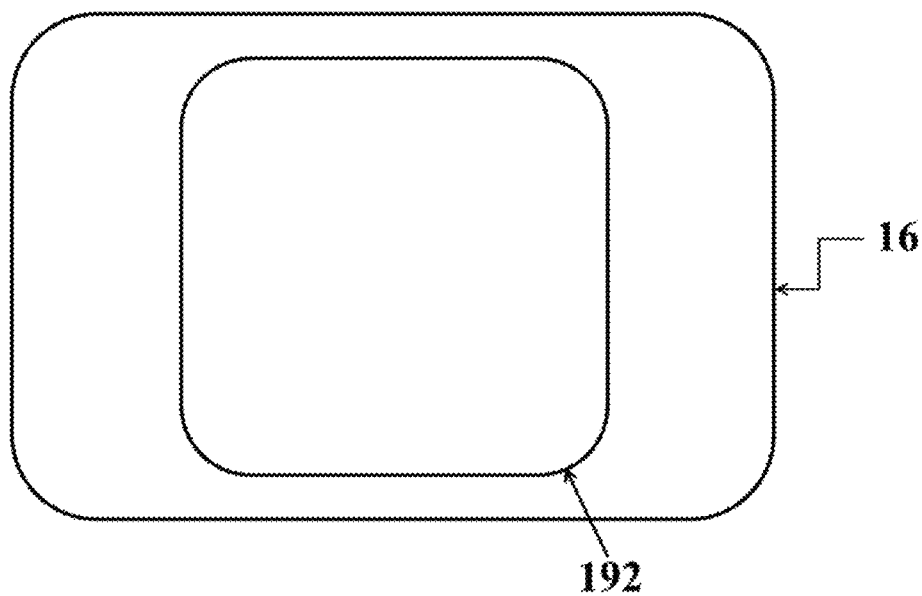

As shown in FIGS. 3(*a*), 3(*b*) and 3(*c*), the microwave assisted flash pyrolysis system 1 or 2 of the present invention further comprises a tube 31. The tube 31 is connected to the chamber 16 through wet gas outlet 192.

As shown in FIG. 1(*a*) and FIG. 4, the microwave assisted flash pyrolysis system 1 further comprises a gas collection unit 41. The gas collection unit 41 can directly connect the wet gas outlet 192 as shown in FIG. 1. The gas collection unit 41 can also connect the wet gas outlet 192 through a tube 31 as shown in FIG. 4. The arrow sign 411 in FIG. 4 expresses the direction of pyrolysis gas leaving the chamber 16 after microwave assisted flash pyrolysis. The pyrolysis gas will be collected by the gas collection unit 41 and transported away from the flash pyrolysis sector 1050 (or chamber 16), the pyrolysis gas will be treated separately in a next step for further being used to generate energy.

The mechanism of the microwave-transparent rotating window 11 is illustrated in FIGS. 5(*a*), (*b*) and (*c*). The same idea can be applicable to the system 1 as shown in FIG. 1(*a*) that shows a microwave assisted flash pyrolysis system 1 with a first baffle plate 12.

In FIG. 5(*a*), feedstock objects 110 are being dropped onto the microwave-transparent rotating window 11 as the microwave-transparent rotating window 11 is moving clockwise, from the right to the left (seen from the front) as the arrow 111 expresses. FIGS. 5(*b*) and 5(*c*) show that the feedstock objects 110 are carried and moved in the same direction on the moving microwave-transparent rotating window 11.

Figure 6A:
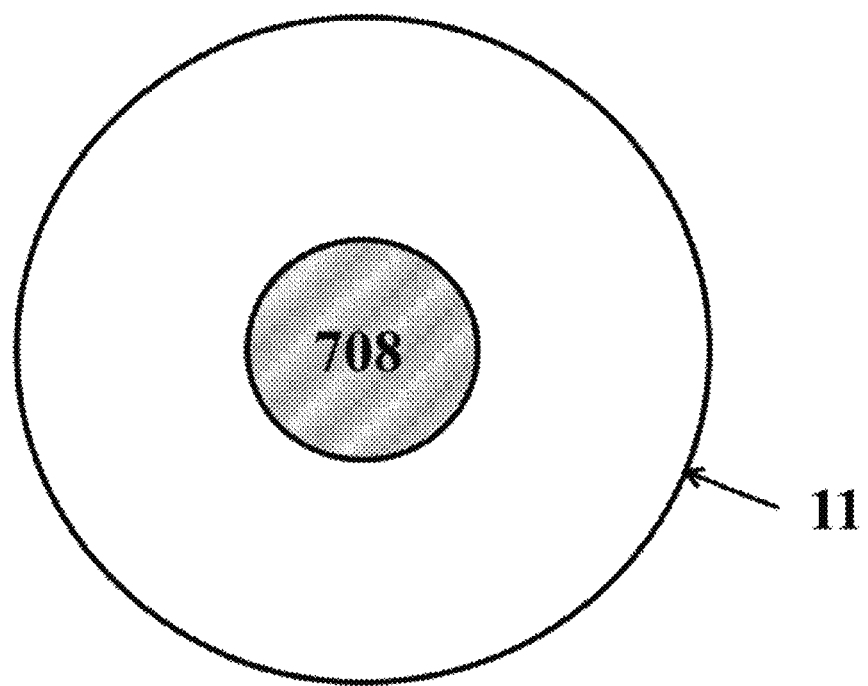
FIGS. 6(*a*), 6(*b*) and 6(*c*) show different types of microwave-transparent rotating window used in the present invention.
Figure 6B:
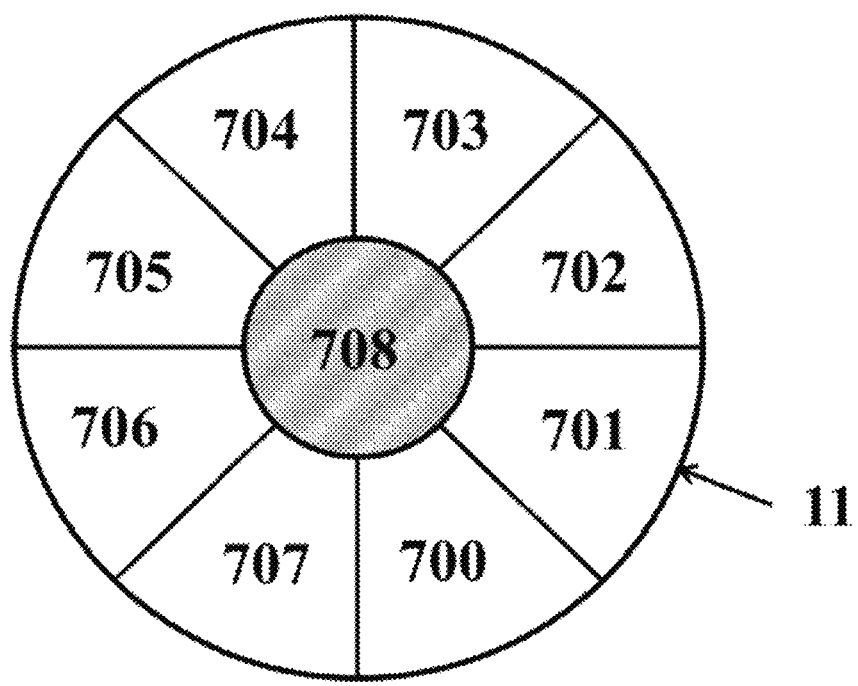
Figure 6C:
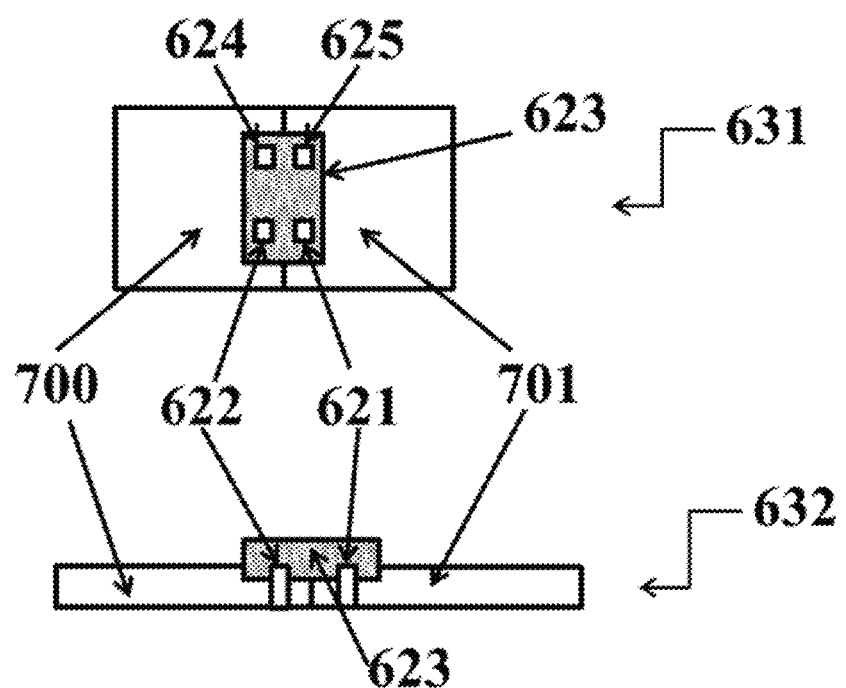

The present invention provides several types of microwave-transparent rotating window 11. FIG. 6(*a*) shows a one-body shape, jointless design of microwave-transparent rotating window 11. FIG. 6(*b*) shows another design of microwave-transparent rotating window 11. The microwave-transparent rotating window 11 includes several plates (700, 701, 702, 703, 704, 705, 706 and 707). 631 and 632 in FIG. 6(*c*) indicates the top and side view of the plate, respectively. FIG. 6(*c*) further shows how the plates may be jointed, or mechanically connected. For example, the plate 700 and the plate 701 are connected mechanically by a joint mechanism. The joint mechanism comprises a frame 623 and four sticks (621, 622, 624, and 625). The two sticks 622, 624 are inserted into the plate 700, and the other two sticks 621, 625 are inserted into the plate 701.

Figure 7A:
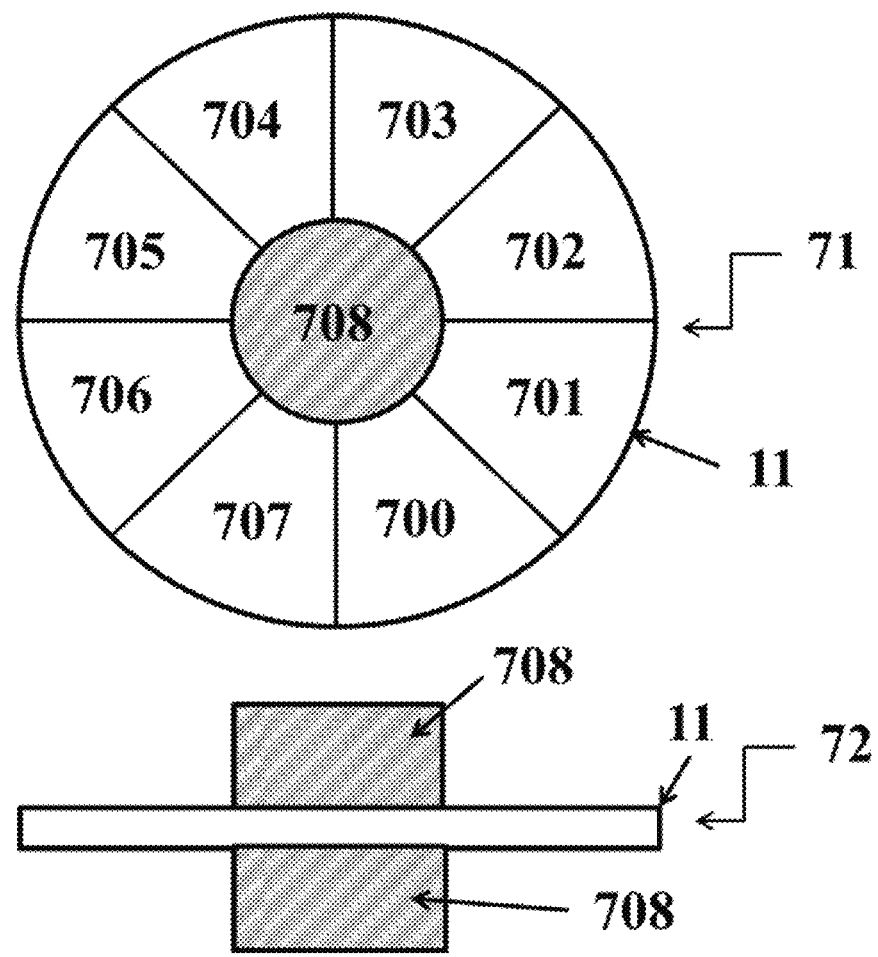
FIGS. 7(*a*), 7(*b*) and 7(*c*) show a top view that how a microwave-transparent rotating window is operating for some embodiments of the present invention.
Figure 7B:
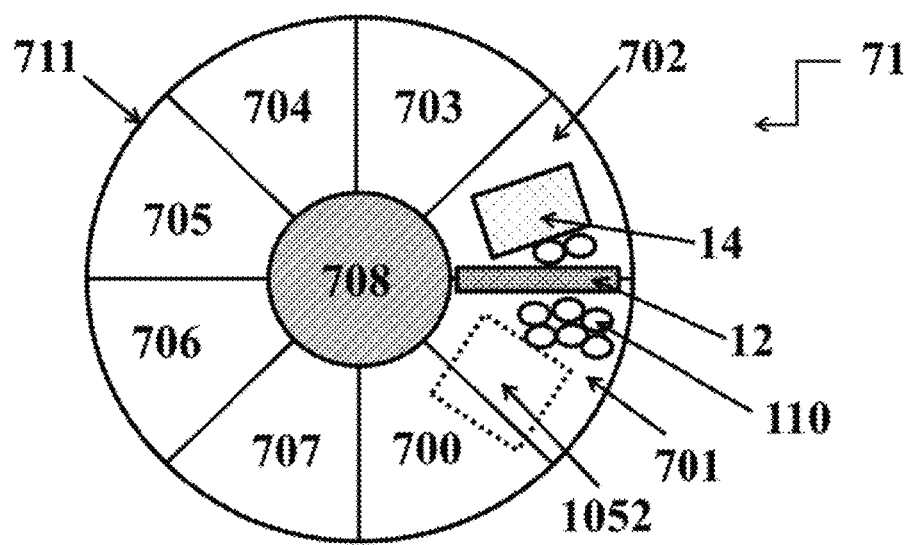
Figure 7C:
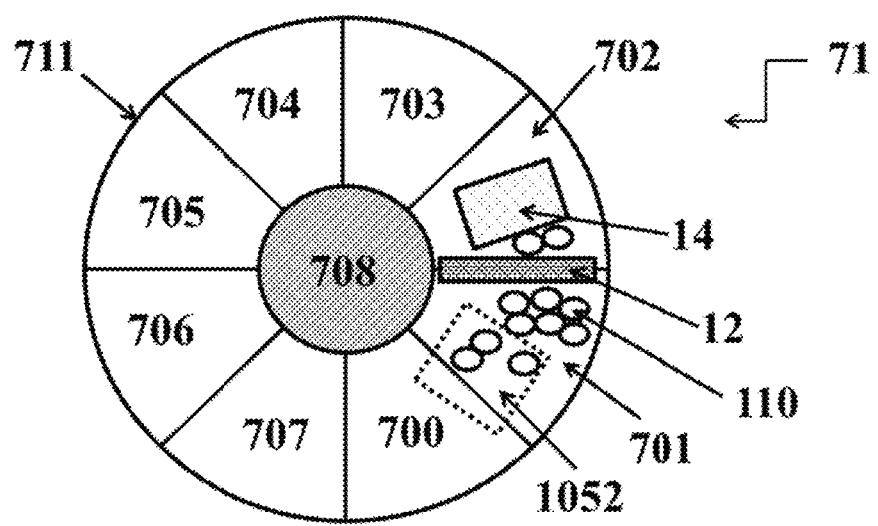
Figure 8A:
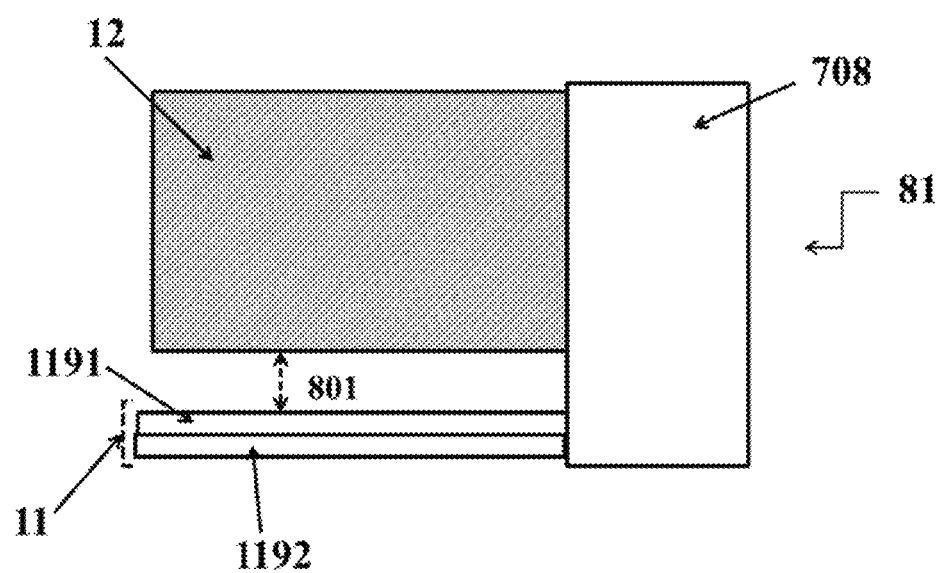
FIGS. 8(*a*), 8(*b*), 8(*c*) and 8(*d*) show one kind of first baffle plate used in some embodiments of the present invention.
Figure 8B:
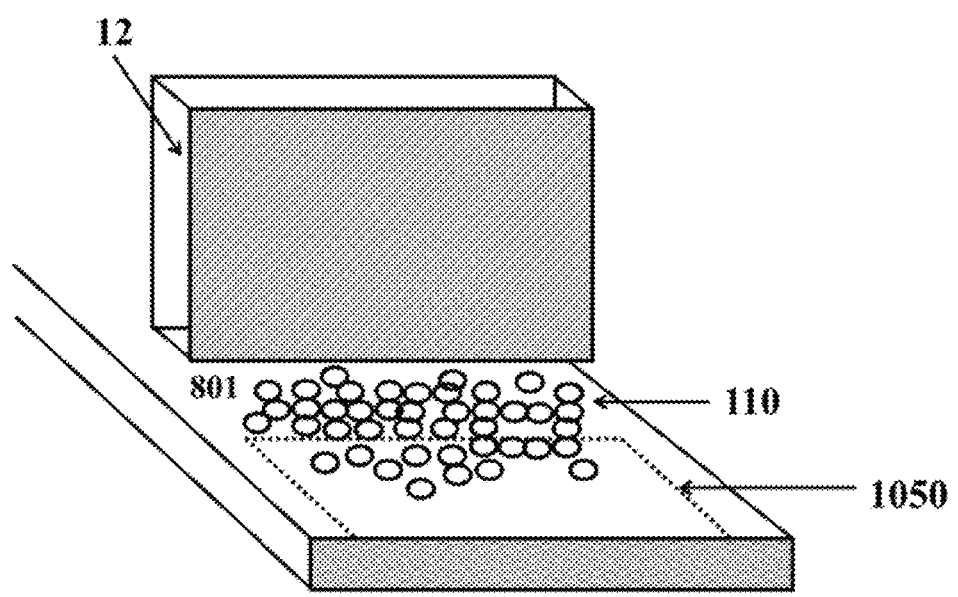
Figure 8C:
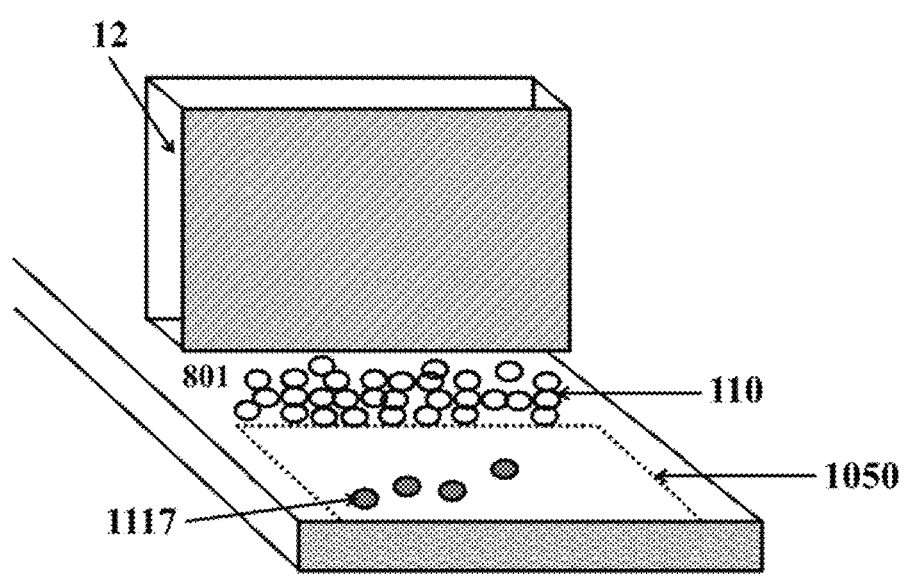
Figure 8D:
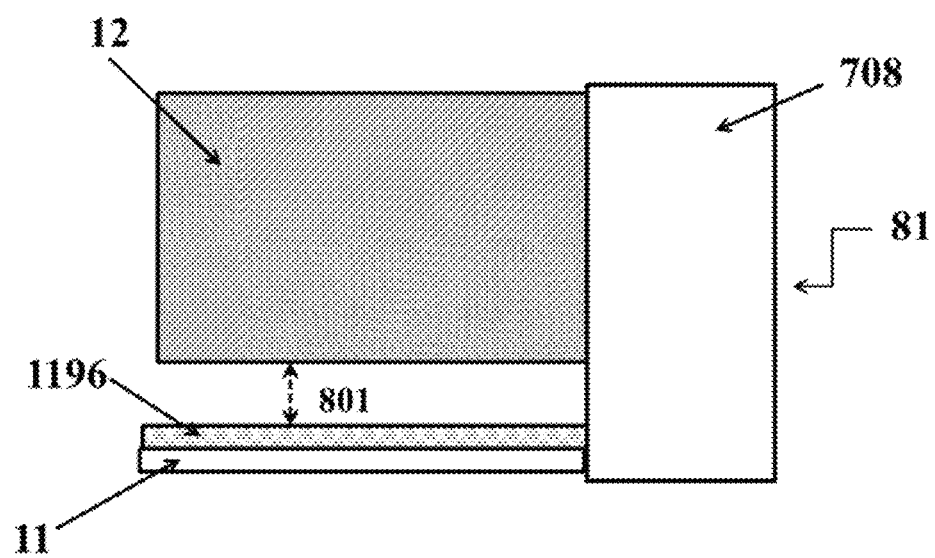

FIGS. 7(*a*), 7(*b*) and 7(*c*) show a rotating mechanism of a microwave-transparent rotating window 11. FIG. 7(*a*) shows the top view 71 of the mechanism and the side view 72 of the mechanism. The mechanism also includes a shaft 708 (or, namely, an axis 708), and the microwave-transparent rotating window 11 rotates around the center of the shaft 708.

In other words, the microwave-assisted flash pyrolysis system of the present invention could further comprise a shaft 708, and the shaft 708 is disposed on a center of the microwave-transparent rotating window 11. FIGS. 7(*a*), 7(*b*) and 7(*c*) show a rotating mechanism that is part of the microwave-assisted flash pyrolysis system of the present invention in some embodiments, and the rotating mechanism enables the microwave-transparent rotating window 11 to rotate. It should be noted that any suitable rotation mechanism could be applied to the present invention.

FIG. 7(*b*) illustrates the operation of the microwave-transparent rotating window 11 mechanism. A feedstock inlet 14 provides feedstock objects 110 onto a microwave-transparent rotating window 11. That is, the feedstock objects 110 will be left on the microwave-transparent rotating window 11. Please refer to FIG. 7(*c*). As the microwave-transparent rotating window 11 rotates, the feedstock objects 110 are carried and moved to a pyrolysis sector 1050 (marked by a dashed line in FIGS. 7(*b*) and 7(*c*)) that is right above a microwave inlet 15 (in FIGS. 1(*b*), 5(*a*), 5(*b*) and 5(*c*)).

The microwave assisted flash pyrolysis system needs microwave-transparent windows to shield the microwave equipment from damage. In the mean time, said microwave-transparent windows need to be a "window" for introducing the microwave into chamber. Here, the microwave-transparent rotating window performs as a shield and window to microwave, where microwave energy generated by microwave generator could transmit through the microwave-transparent rotating window. Therefore, the microwave-transparent rotating windows could be composed of different materials, plates or layers to shield the microwave equipment from damage and introduce the microwave into chamber.

In some embodiments, as shown in FIG. 8(*a*), the microwave-transparent rotating window 11, used in the present invention could comprise one or more microwave transparent materials, plates or layers 1191 and 1192. The top layer 1191 could function as a heat-transfer barrier preventing thermal shock to the microwave-transparent rotating window 11. The bottom layer 1192 could function as a microwave transparent feedstock-carrying device. The materials used for the top layer 1191 include, but are not limited to, glass, boron nitride (BN), or alumina ($Al_2O_3$) or other microwave transparent materials that could resist a certain amount of heat or temperature. The materials used for the bottom layer 1192 include, but are not limited to, alumina or other microwave transparent material that has a certain physical strength, at least strength enough to carry the amount of weight represented by the feedstock placed at top of it.

In addition, the top layer 1191 of each plate of the microwave-transparent rotating window, mentioned above could be composed of ceramic materials. The selection of workable ceramic materials follows the requirements as follows:

Microwave-transparent (meaning microwave could pass through such material);
Thermally resistant;
Thermally chock resistant;
Easily machine-able;
Non-porous (to not accumulate e.g. char which would cause thermal runaway and excess heating);
Inexpensive and readily available.

It should be noted that not all requirements have to exist coincidentally. The purposes of choosing the right materials includes preventing the plate from being cracked due to hot spots generated throughout the microwave assisted flash pyrolysis.

As shown in FIG. 8(*d*), in some embodiments, the microwave-assisted flash pyrolysis system of the present invention could further comprise a microwave-transparent plate 1196 that is resistant to thermal shock if the microwave-transparent rotating window is composed of one material, plate or layer which is not resistant to thermal shock. The microwave-transparent plate 1196 is disposed on the microwave-transparent rotating window 11.

The present invention also provides more details about a first baffle plate 12. The first baffle plate 12 is placed above the microwave-transparent rotating window 11. Please refer to FIG. 8(*a*) that illustrates the side view 81 of a first baffle plate 12 in terms of its relative locations to a shaft 708 and the microwave-transparent rotating window 11. The distance of gap 801 between the bottom of the first baffle plate 12 and the microwave-transparent rotating window 11, is decided by a rule regarding focus and penetration depth (into the feedstock) of the microwave energy to maximize the reflection of microwaves through the gap 801, as shown in FIG. 8(*a*), should be minimized so as to meet any energy efficiency requirement desired by a user of the present invention.

FIG. 8(*b*) illustrates a structure of a first baffle plate 12. Feedstock objects 110 pass through a gap 801, and reach a microwave assisted pyrolysis sector 1050 (marked by a dashed line). In the pyrolysis sector 1050, microwave assisted flash pyrolysis is carried out over the feedstock objects 110. Please refer to FIG. 8(*c*) an FIG. 10. If the microwave energy is dense and strong enough, all feedstock objects 110 will be heated and transformed into wet pyrolysis gas and chars 1117 in a quite short pryolysis time.

In some embodiments, the microwave-assisted flash pyrolysis system of the present invention has the first baffle plate 12 and second baffle plate 121 that comprise at least one gas nozzle for introducing inert gases. The idea is described as follows.

Figure 9A:
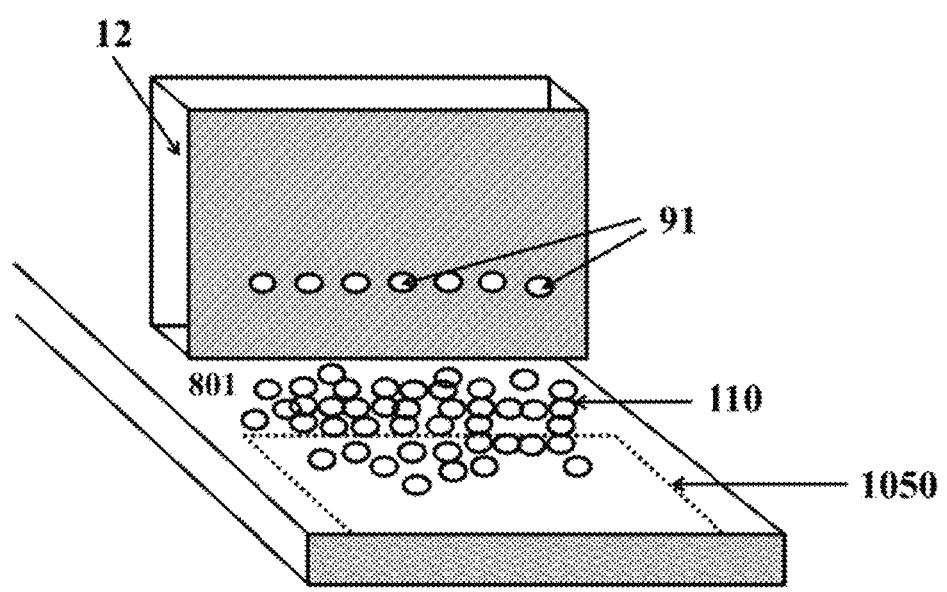
FIGS. 9(*a*), 9(*b*) and 9(*c*) show one kind of first baffle plate used in some embodiments of the present invention.

To make microwave pyrolysis more complete, the present invention provides a solution where a first baffle plate 12 has at least one gas inlet 91, as shown in FIGS. 9(*a*) and 11(*d*). In FIG. 9(*a*), a first baffle plate 12 has more than one gas inlets 91. But, in some embodiments, a first baffle plate 12 could have only one gas inlet 91.

Figure 9B:
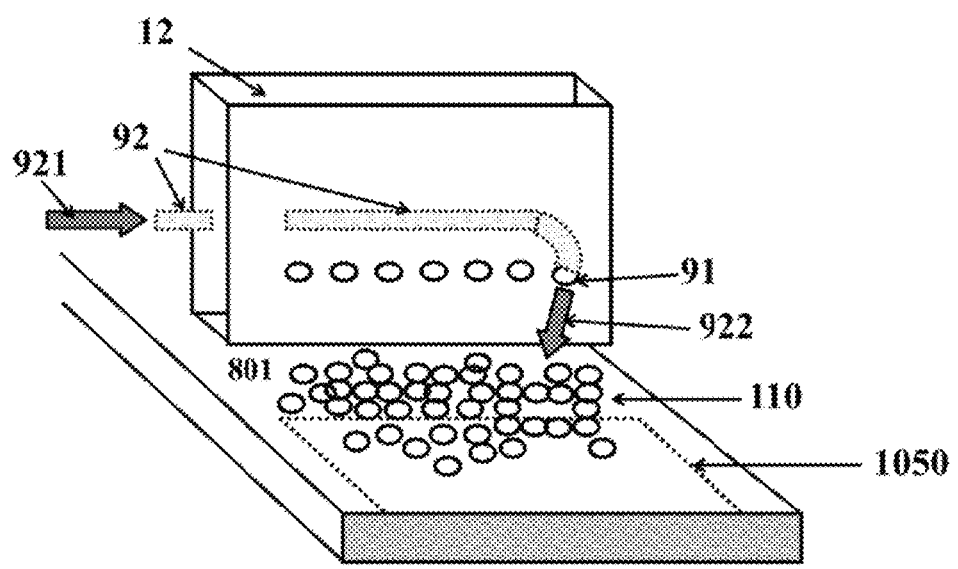
Figure 9C:
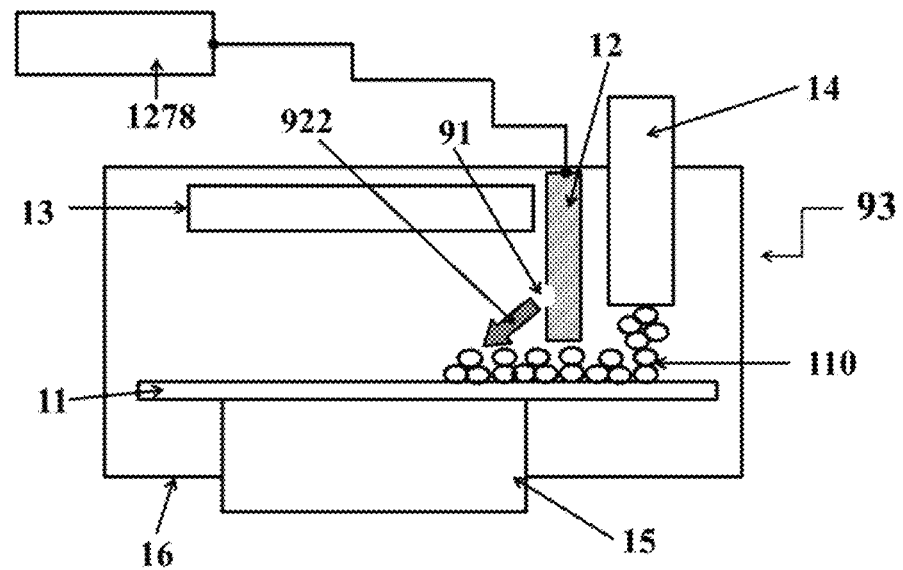
Figure 11A:
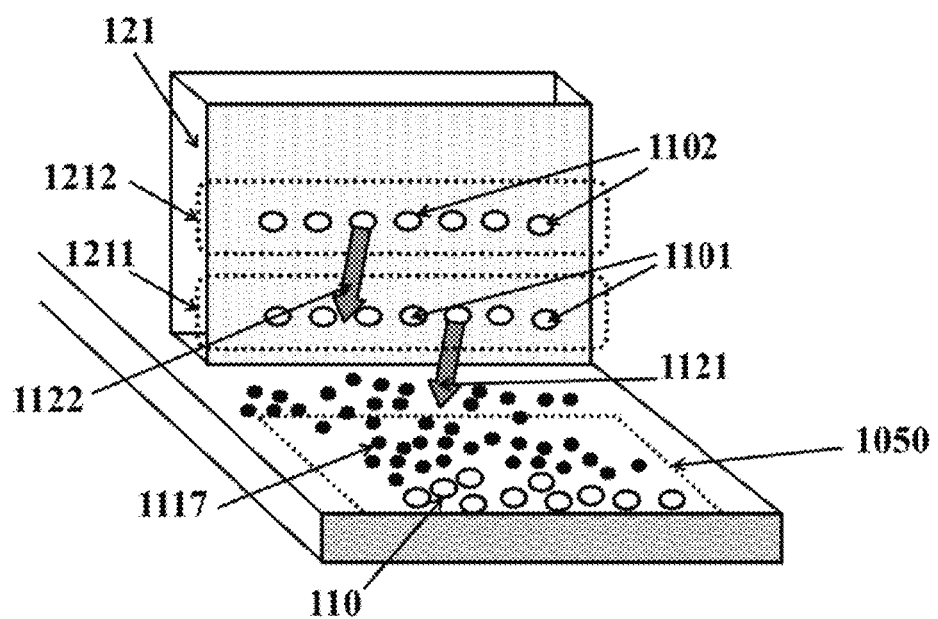
FIGS. 11(*a*), 11(*b*), 11(*c*) and 11(*d*) show one kind of second baffle plate used in some embodiments of the present invention.

Through a gas inlet 91, inert gas can flow onto the microwave assisted pyrolysis sector 1050 to mix with the feedstock objects 110 while microwave assisted pyrolysis is going on. FIG. 9(*b*) shows an exemplary design of a first baffle plate 12 having a gas inlet 91. Inside the first baffle plate 12 is a gas tube 92. The gas tube 92 will direct inert gas from one end of the gas tube 92 to a corresponding gas inlet 91. Two arrows 921, 922 show the gas flow direction. FIG. 9(c) shows a side view 93 of how inert gas injection is operating in terms of what is described according to FIG. 9(b). The present invention also provides more details about a second baffle plate 121. As shown in FIG. 11(a), a second baffle plate 121 used in the present invention could further has one first gas inlet 1101 and one second gas inlet 1102. The first gas inlet 1101 is disposed near one end 1211 of the second baffle plate 121, while the second gas inlet 1102 is disposed near a middle region 1212 of the second baffle plate 121.

The purposes of the second gas inlet 1102 include providing a gas flow 1122 to cool down the hot spots occurring on the microwave-transparent rotating window 11. The purposes of the first gas inlet 1101 include providing a gas flow 1121 to clean the microwave-transparent rotating window 11 while the microwave-transparent rotating window 11 is approaching the second baffle plate 121.

Figure 11B:
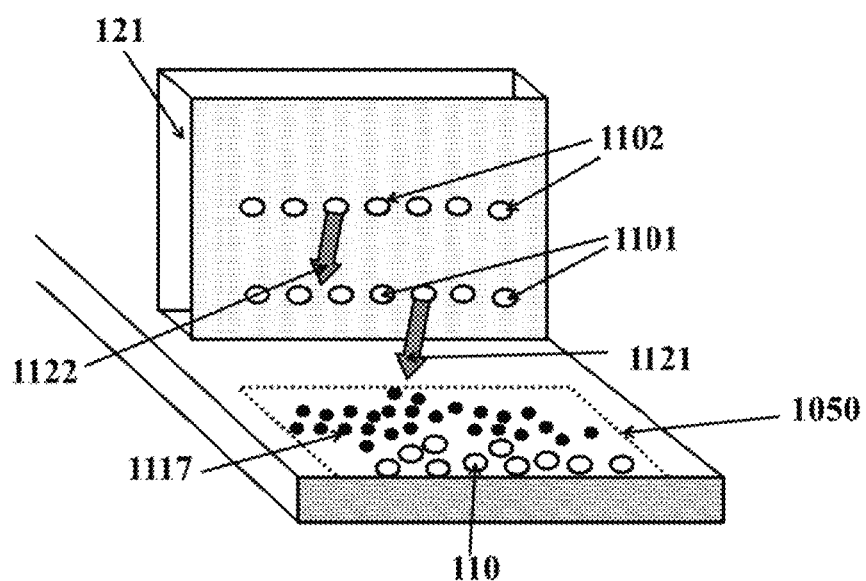

FIGS. 11(a) and (b) express the idea of how a first gas inlet 1101 cleans the microwave-transparent rotating window 11. In FIG. 11(a), chars 1117 is often the dry end product of the microwave assisted flash pyrolysis of feedstock objects 110. The chars 1117 are leaving the microwave assisted pyrolysis sector 1050, and moving toward to a second baffle plate 121. As the chars 1117 are approaching the second baffle plate 121, a gas flow 1121 will leave the first gas inlet 1101, and blow into the chars 1117 and towards the chars so as to let the chars 1117 be moved back to the microwave assisted pyrolysis sector 1050. As shown in FIG. 11(b), the chars 1117 are forced by the gas flow 1121 to stay within the microwave assisted pyrolysis sector 1050. If the inert gas is steam, a water gas shift reaction will occur. The water-gas shift reaction (WGS) is a chemical reaction where hot carbon reacts with water vapor to form carbon dioxide and hydrogen: $C+H_2O \rightarrow CO+H_2$. The water-gas shift reaction is an important industrial reaction. It is often used in steam reforming of methane or other hydrocarbons. As a result, the chars 1117 could be transformed to pyrolysis gas (for example, CO and $H_2$) by the microwave assisted flash pyrolysis.

Figure 11C:
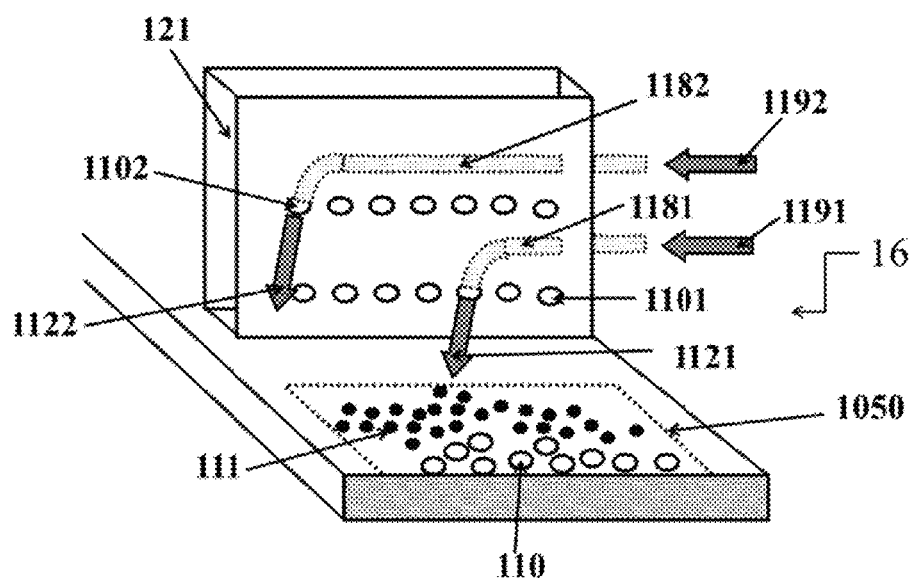

FIG. 11(c) shows the internal structure of a second baffle plate 121 regarding gas tubes 1181, 1182 that are used to direct gas to the chamber 16, or the microwave assisted pyrolysis sector 1050.

Figure 11D:
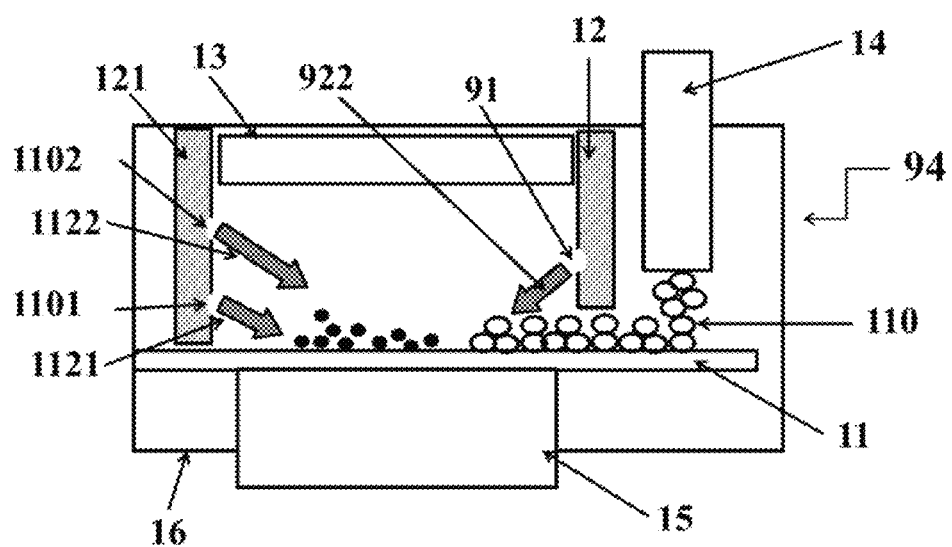

As shown in FIG. 11(c), a gas tube 1182 is disposed inside the second baffle plate 121. The gas tube 1182 will direct inert gas from one end of the gas tube 1182 to a corresponding second gas inlet 1102. Two arrows 1192, 1122 show the gas flow direction. FIG. 11(d) shows a side view 94 of how inert gas injection related to a second gas inlet 1102 is operating in terms of what is described according to FIG. 11(c).

As shown in FIG. 11(c), inside a second baffle plate 121 is a gas tube 1181. The gas tube 1181 will direct inert gas from one end of the gas tube 1181 to a corresponding first gas inlet 1101. Two arrows 1191, 1121 show the gas flow direction. FIG. 11(d) shows a side view 94 of how inert gas injection related to a first gas inlet 1101 is operating in terms of what is described according to FIG. 11(c).

In some embodiments, both baffle plates 12, 121 have built-in nozzles radially that will flush the volume between these two baffle plates 12, 121 with inert gas (during the start-up of microwave assisted flash pyrolysis), or will recirculate non-condensable pyrolysis gas (after the start-up of microwave assisted flash pyrolysis) to further force the pyrolysis gas to vapor out of a chamber 16 as fast as possible.

Figure 10:
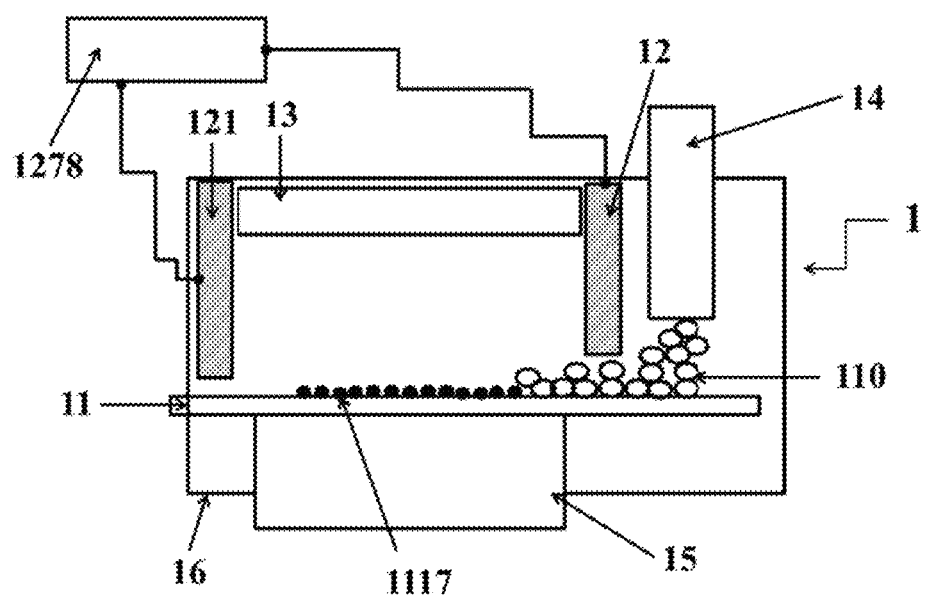
FIG. 10 shows one kind of second baffle plate used in some embodiments of the present invention.

The microwave-assisted flash pyrolysis system of the present invention could comprise a gas flow system 1278 for controlling gas flows, as shown in FIGS. 9(c) and 10. As mentioned above, the first baffle plate 12 and second baffle plate 121 have gas nozzles or gas tubes. The microwave-assisted flash pyrolysis system of the present invention provides a gas flow system 1278 to control the gas flow rates in those nozzles or tubes. Any commercial gas flow system could be applied to the present invention.

The gas injected into the pyrolysis sector might provide an effect on temperature control. But, the microwave-assisted flash pyrolysis system of the present invention could further have a cooling system for controlling a temperature of the chamber. Please refer to FIG. 1(c). In some embodiments, the microwave-assisted flash pyrolysis system 1 comprises a cooling system 1974 to control a temperature of certain components or the chamber 16.

Figure 12A:
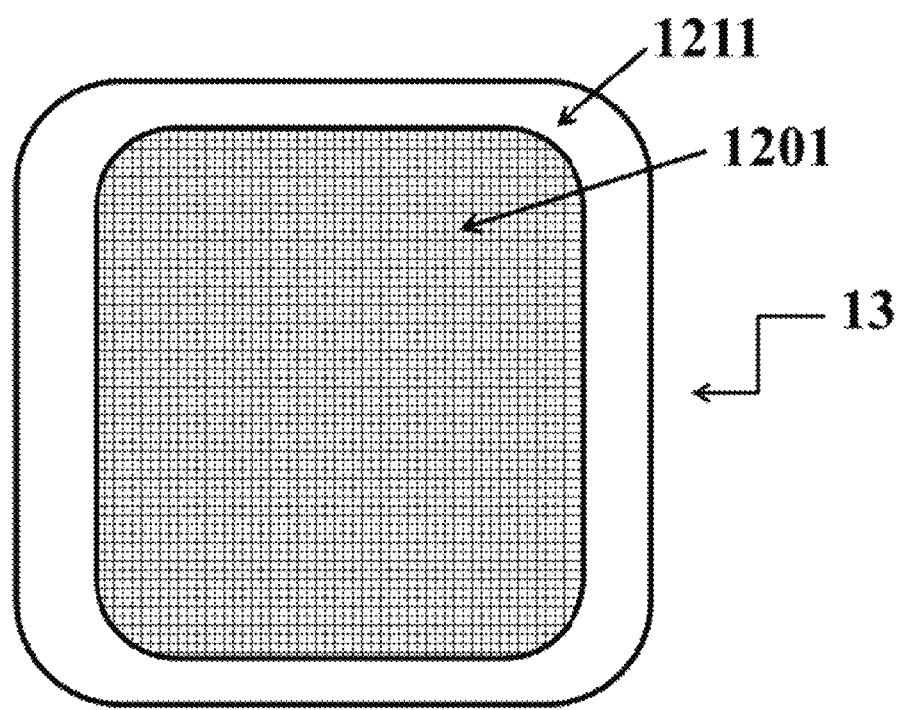
FIGS. 12(*a*), 12(*b*) and 12(*c*) show some kinds of tuning plate used in some embodiments of the present invention.
Figure 12B:
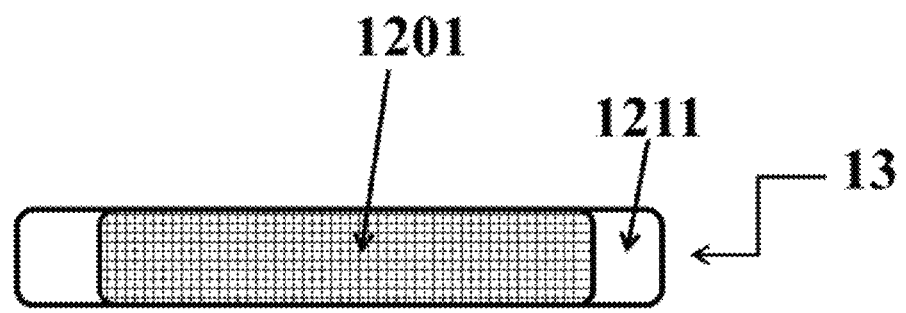

The present invention also provides more details about the structure of a tuning plate 13 as shown in FIGS. 12 (a) to 12(c). In one embodiment, FIG. 12(a) is a top view of the tuning plate 13, and FIG. 12(b) is a side view of the tuning plate 13. The tuning plate 13 has a single layer as shown in FIG. 12(b).

As shown in FIG. 12(a), a tuning plate 13 may have a ring 1211 and a catalyst mesh 1201. The ring 1211 and the catalyst mesh 1201 can be separated. The ring 1211 and the catalyst mesh 1201 may be jointed mechanically together by some joint members. When the ring 1211 is separated from the catalyst mesh 1201, a hole can be shown on the tuning plate 13. In other words, the catalyst mesh 1201 is located in the hole of the tuning plate 13.

Figure 12C:
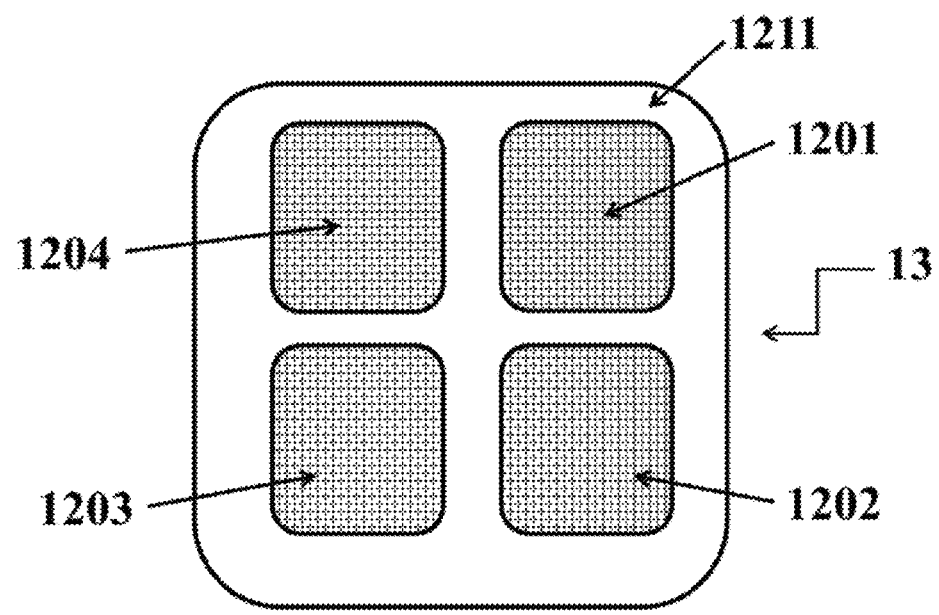

As shown in FIG. 12(c), a tuning plate 13 may have many catalyst meshes 1201, 1202, 1203 and 1204. So, the tuning plate 13 may have many holes, correspondingly.

"Catalyst mesh" means that a mesh that comprises catalyst materials. The catalyst materials can transform pyrolysis gas into carbon monoxide and hydrogen, meaning the gas flow that is leaving the chamber 16 will not comprise gases other than carbon monoxide and hydrogen. It should be noted that the leaving gas flow might still comprise gases other than carbon monoxide and hydrogen because the catalyst used might be aged, or poisoned, so as to reduce the efficiency of the pyrolysis gas transformation.

Figure 13A:
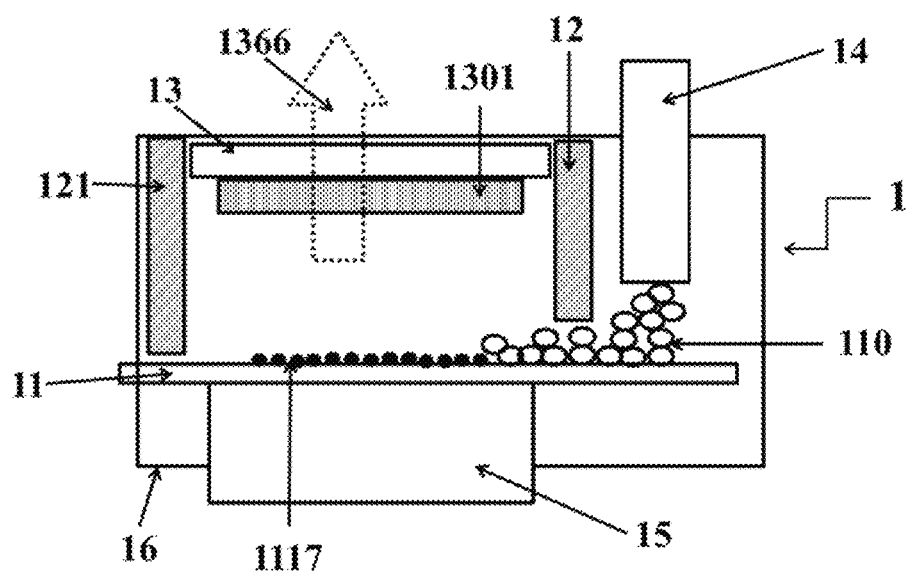
FIGS. 13(*a*), 13(*b*), 13(*c*), 13(*d*) and 13(*e*) show some kinds of tuning plate used in some embodiments of the present invention.

Alternatively, the present invention provides another structure related to a tuning plate 13. As shown in FIG. 13(a), a catalyst mesh 1301 is a separate device from a tuning plate 13. The catalyst mesh 1301 is disposed over a microwave-transparent rotating window 11. And, the catalyst mesh 1301 is disposed below the tuning plate 13.

As shown in FIG. 13(a), the microwave-assisted flash pyrolysis system 1 could further comprise a catalytic mesh 1301 for further cracking chemical bonds and for separating chemical binding components in wet pyrolysis gas. The catalytic mesh 1301 is located on (FIG. 3(d)), fastened to (FIG. 3(a)), or located underneath (FIG. 3(e)), the tuning plate 13. Please refer to FIG. 13(a) again. The catalytic mesh 1301 is located above the microwave-transparent rotating window 11.

As shown in FIG. 13(a), pyrolysis gas will flow through the catalyst mesh 1301 and the tuning plate 13. The flow direction is labeled as an arrow 1366.

Figure 13B:
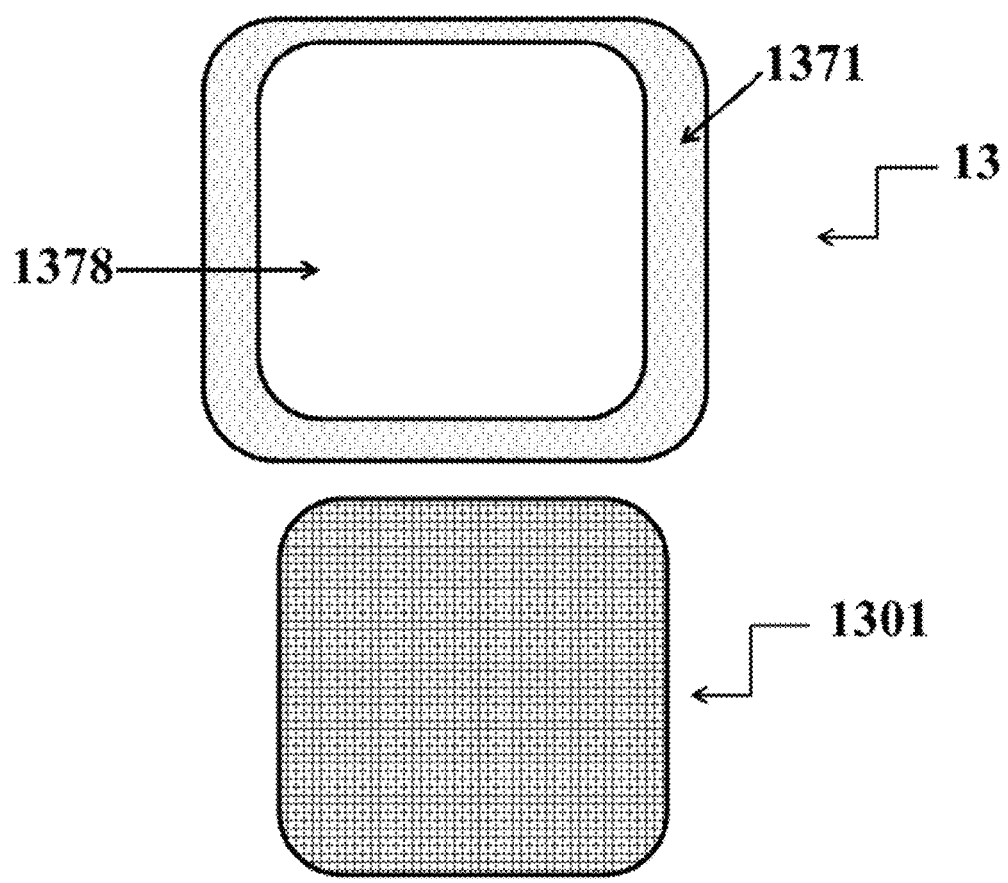

FIG. 13(b) shows one sample of a catalyst mesh 1301 and one sample of a tuning plate 13. A tuning plate 13 comprises a ring member 1371. There is a hole 1378 on the tuning plate 13. The catalyst mesh 1301 is a mesh located below the tuning plate 13. Pyrolysis gas will pass through the catalyst mesh 1301 first, and then leave the chamber 16 through the hole 1378.

Figure 13C:
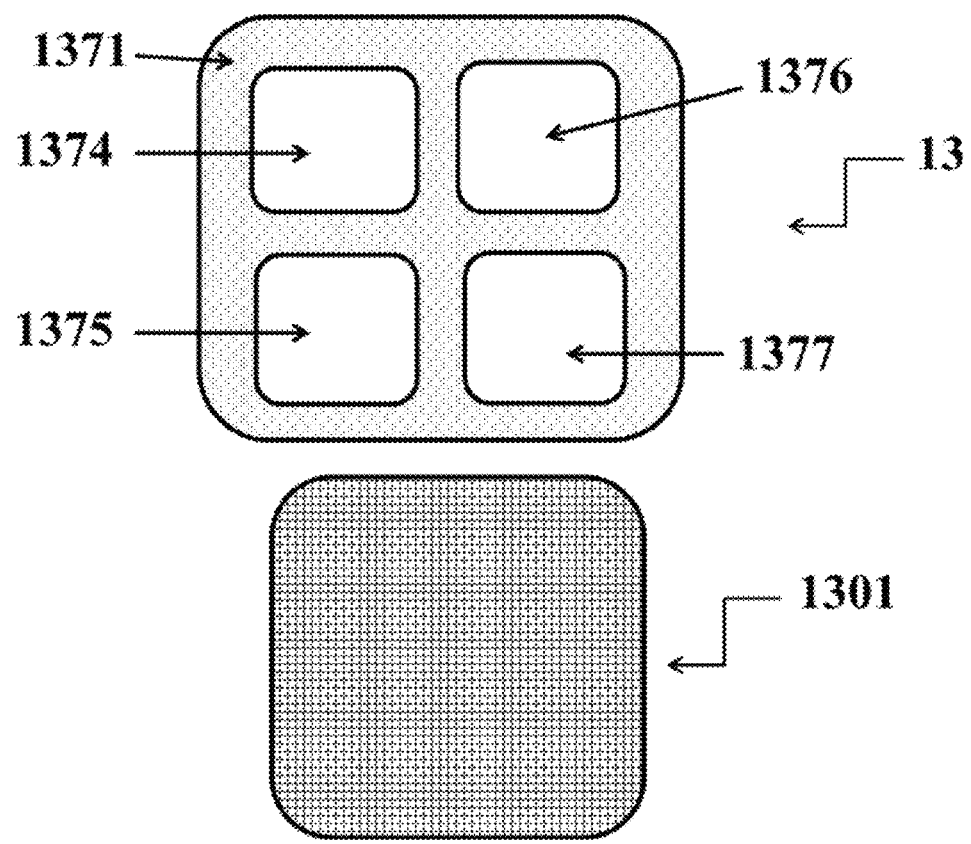
Figure 13D:
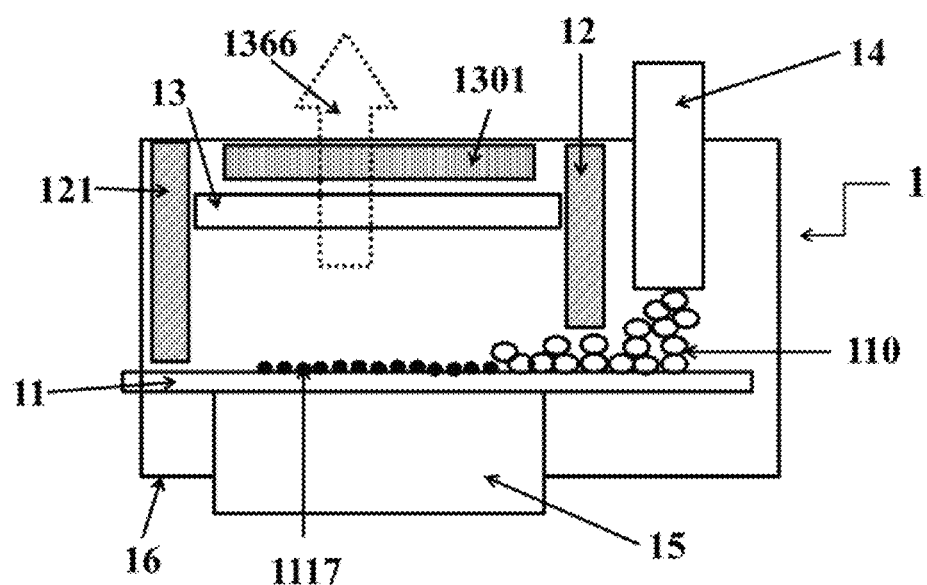
Figure 13E:
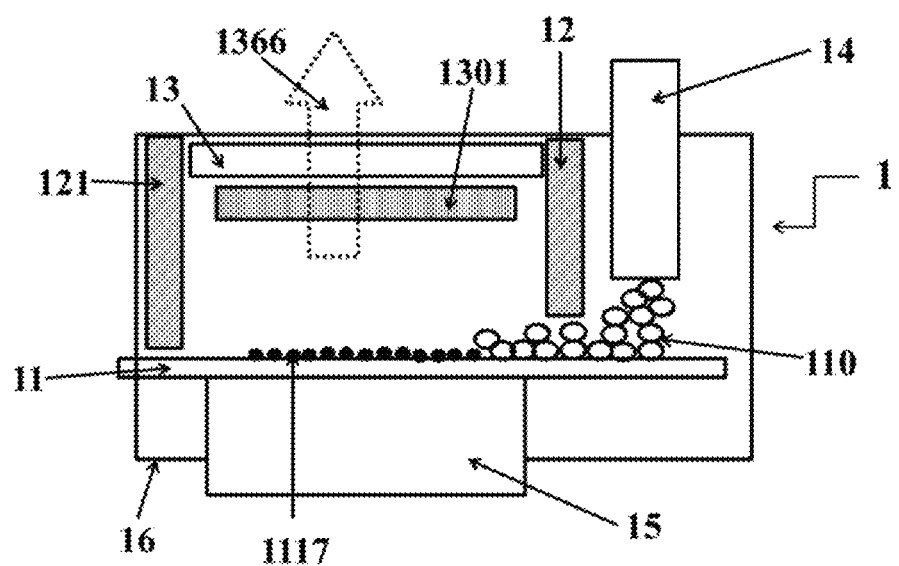

Alternatively, there may be several holes 1374, 1375, 1376 and 1377 in a tuning plate 13 as shown in FIG. 13(c).

The microwave-assisted flash pyrolysis system of the present invention further comprises a tuning plate 13 and an adjusting mechanism. The adjusting mechanism is automatically or manually operated. The tuning plate 13 is connected to the adjusting mechanism. Please refer to FIG. 1(a) again. The tuning plate 13 is disposed between the microwave-transparent rotating window 11 and the wet gas outlet 192.

The tuning plate 13 is used for optimizing the pyrolysis sector and for securing maximum microwave energy to enter input feedstocks and to be absorbed by the input feedstocks. The tuning plate 13 is also used to minimize reflected power to microwave magnetron and to keep maximum energy efficiency in the pyrolysis sector 1050, for example, as shown in FIGS. 15(b) and 15(c).

Figure 14A:
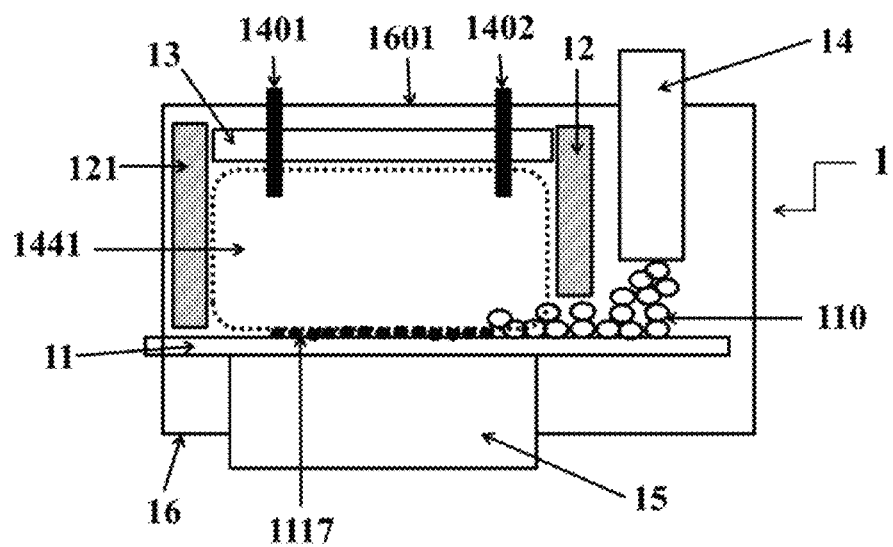
FIGS. 14(*a*) and 14(*b*) show some kinds of tuning plate used in some embodiments of the present invention.

The present invention also provides another structural explanation about a tuning plate 13. In some embodiments, the tuning plate 13 is fixed at one level as shown in FIG. 14(a). The present invention provides an adjusting mechanism to fix a tuning plate 13 at one position. As shown in FIG. 14(a), at least one stick 1401, 1402 is provided to fix the position of a tuning plate 13. The stick 1401 (or, 1402) penetrates the tuning 1601 of the chamber 16, and is fixed to the tuning 1601. The stick 1401 (or, 1402) also penetrates the tuning plate 13, and is fixed to the tuning plate 13. By this adjusting mechanism, a tuning plate 13 is not movable during microwave pyrolysis.

As shown in FIG. 14(a), a non-movable tuning plate 13 creates a pyrolysis sector 1050 marked by a dashed line. "Pyrolysis sector" means a region that contains microwave energy. Microwave energy is here limited to a specially designed region so as to tune, said at any time make the region as optimal as possible to continuously perform the microwave assisted flash pyrolysis most efficient.

Figure 14B:
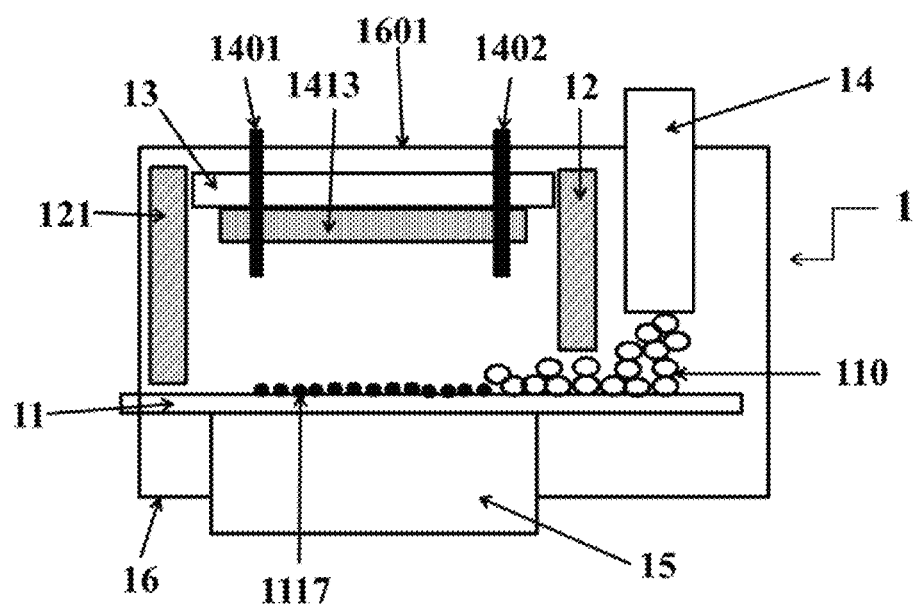

Alternatively, FIG. 14(b) shows another embodiment where a catalyst mesh 1413 is separate from a tuning plate 13. Stick 1401 (or, 1402) penetrates the catalyst mesh 1413, and is fixed to the catalyst mesh 1413. By this adjusting mechanism, a tuning plate 13 and catalyst mesh 1413 are not movable during microwave pyrolysis.

Figure 15A:
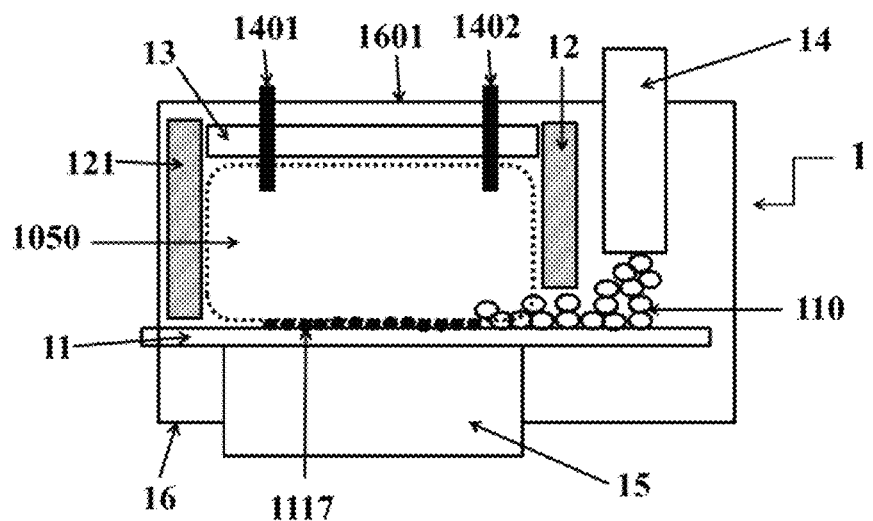
FIGS. 15(*a*), 15(*b*) and 15(*c*) show some kinds of leveling mechanism used in some embodiments of the present invention.
Figure 15B:
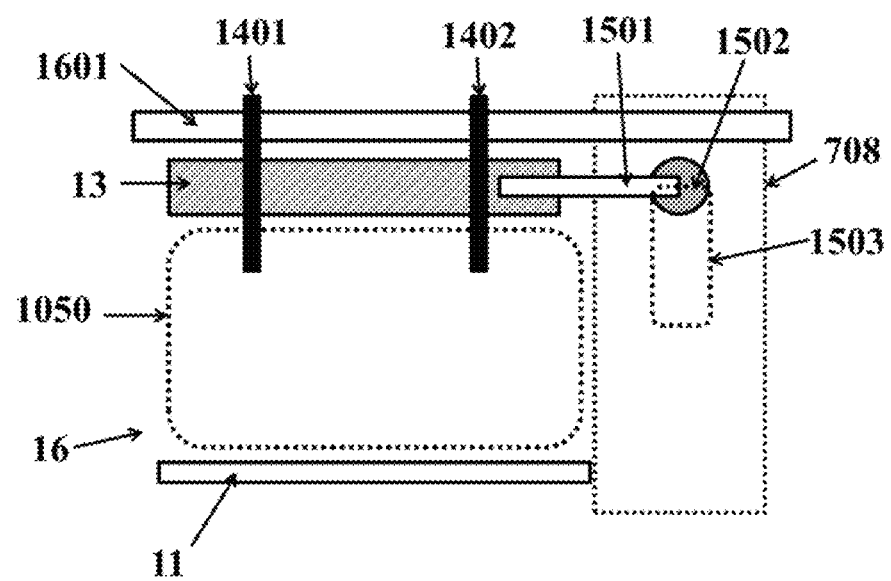
Figure 15C:
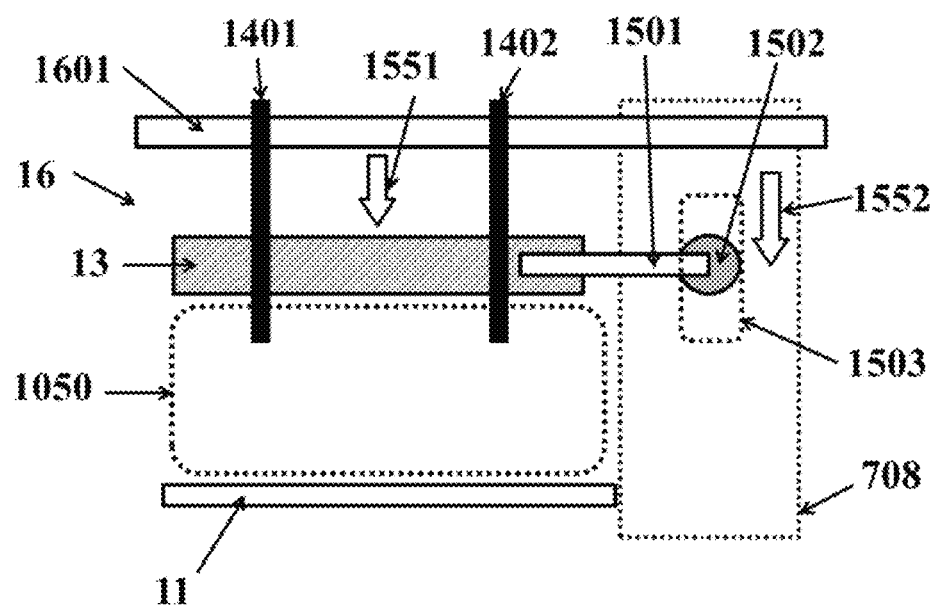

The present invention also provides another structural explanation about a tuning plate 13, where the level of the tuning plate 13 can be changed to adjust the total volume and geometry to tune the specifications of the pyrolysis sector 1050 as shown in FIG. 15(a).

As shown in FIG. 15(a), one embodiment of a microwave assisted flash pyrolysis system of the present invention has a leveling mechanism as an adjusting mechanism. The leveling mechanism comprises at least one stick 1401 (or, 1402), and the stick 1401 (or, 1402) is vertically disposed in a chamber 16. The leveling mechanism is operating in a way that a tuning plate 13 is movable along the stick 1401 (or, 1402).

The movement of a tuning plate 13 along the stick 1401 (or, 1402) can be carried out according to FIG. 15(b). In FIG. 15(b), a leveling mechanism comprises a leveling member 1501, a roller 1502 and a track 1503. The leveling member 1501 is inserted into a tuning plate 13. The leveling member 1501 is fixed to the roller 1502. The roller 1502 can move along the track 1503. In addition, the track 1503 is located in the shaft 708 that is described in those statements related to the microwave-transparent rotating window mode of the present invention.

FIGS. 15(b) and (c) illustrate an operating scheme of one embodiment related to a leveling mechanism. A tuning plate 13 begins at one level, as shown in FIG. 15(b). Then, a process moves the tuning plate 13 downward as follows. A roller 1502 moves downward along a track 1503. Because a leveling member 1501 is fixed to the roller 1502, the leveling member 1501 also moves downward. Consequently, the leveling member 1501 moves the tuning plate 13 downward.

FIG. 15(c) shows the final position of the tuning plate 13 after the movement. The two arrows 1551, 1552 expresses the downward direction of the movement. The movement change the geometry and makes the volume of a pyrolysis sector 1050 smaller than what it 1050 was before the movement.

Figure 16:
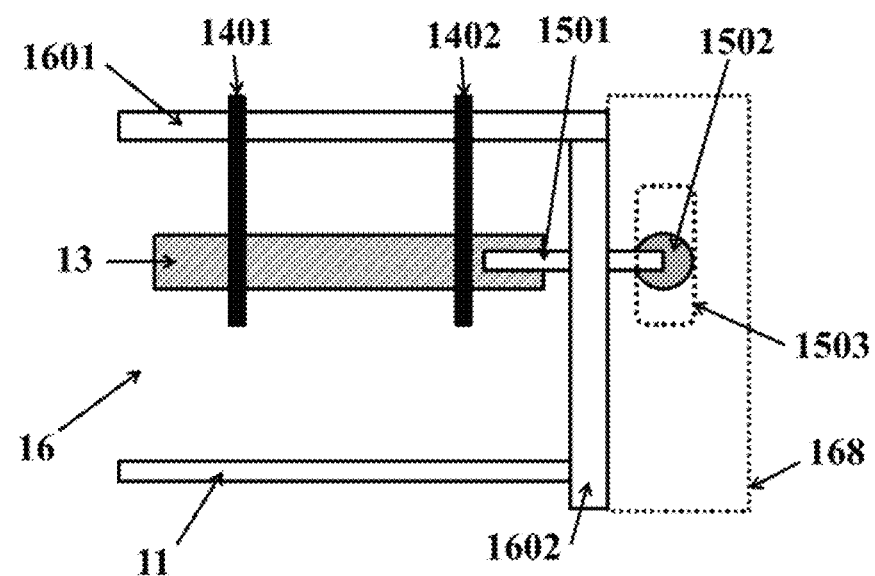
FIG. 16 shows a leveling mechanism of one embodiment of the present invention.

For some embodiments of the present invention, FIG. 16 shows another leveling mechanism as an adjusting mechanism. A chamber 16 has a baffle 1602. The leveling mechanism of FIG. 16 comprises a leveling member 1501, a roller 1502, a track 1503 and a leveling machine 168. The leveling member 1501 is inserted into a tuning plate 13. The leveling member 1501 is fixed to the roller 1502. The roller 1502 can move along the track 1503. In addition, the track 1503 is located in the leveling machine 168. The leveling machine 168 provides mechanical power to operate the roller 1502.

Besides the leveling mechanisms described above, the basic design idea of a leveling mechanism is to let a tuning plate 13 move along a stick 1401 (or, 1402). Any appropriate mechanical design for elevating something can be used to achieve the leveling mechanisms mentioned, or implied, in the description of the present invention.

Figure 17A:
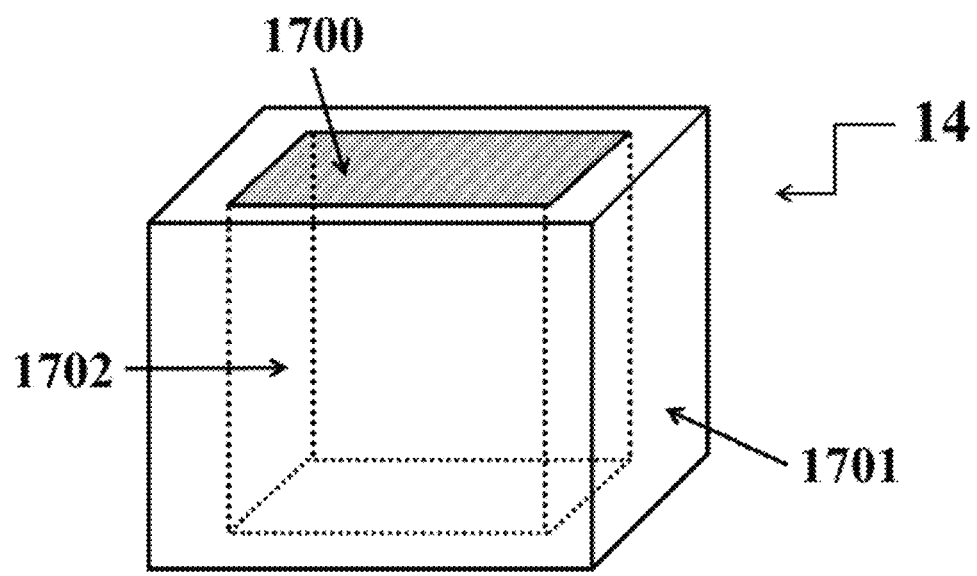
FIGS. 17(*a*) and 17(*b*) show one kind of feedstock inlet used in some embodiments of the present invention.
Figure 17B:
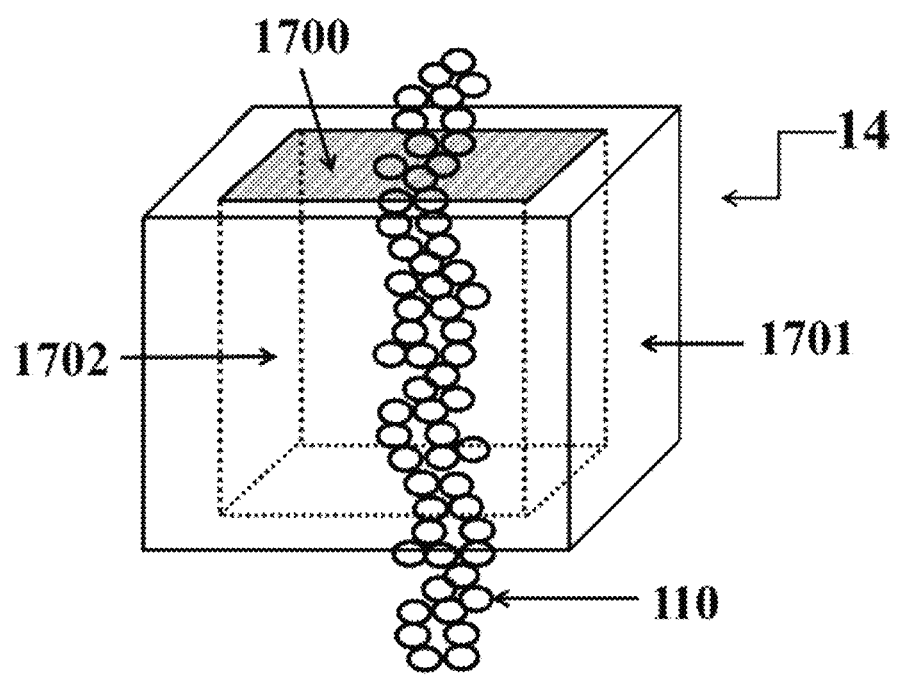

The present invention also provides more details about a feedstock inlet 14. In FIG. 17(a), a feedstock inlet 14 is presented. The feedstock inlet 14 has an outer portion 1701. On the top surface of the feedstock inlet 14 is an opening 1700. Below the opening 1700 is a tunnel 1702. When microwave pyrolysis system of the present invention is operating, feedstock objects 110 are dropped on the opening 1700, as shown in FIG. 17(b). Then, the feedstock objects 110 will pass through the tunnel 1702 to reach the microwave-transparent rotating window 11.

Alternatively, the present invention provides another design for a feedstock inlet 14. Please refer to FIGS. 18(a), 18(b), 18(c) and 18(d). The idea of this alternative design is to create a choke inside the tunnel 1702 of a feedstock inlet 14 shown in FIG. 17(a).

Figure 18A:
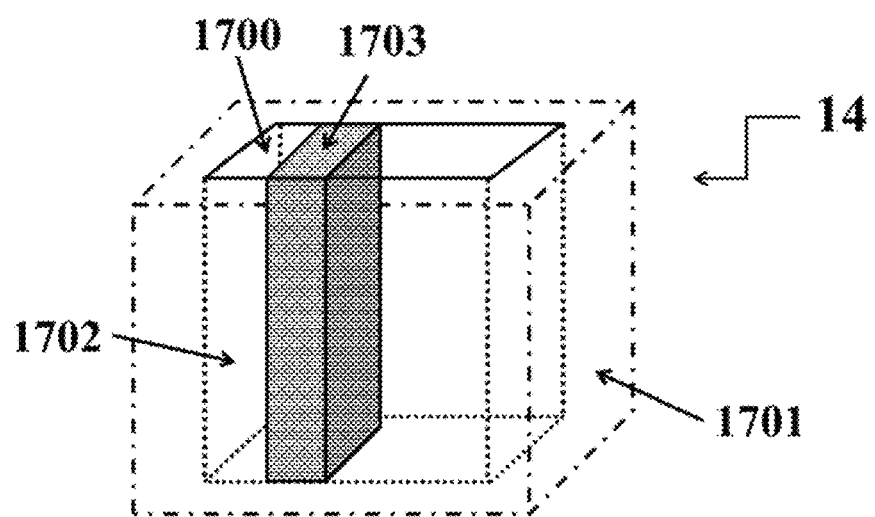
FIGS. 18(*a*), 18(*b*), 18(*c*) and 18(*d*) show some kinds of feedstock inlet used in some embodiments of the present invention.
Figure 18B:
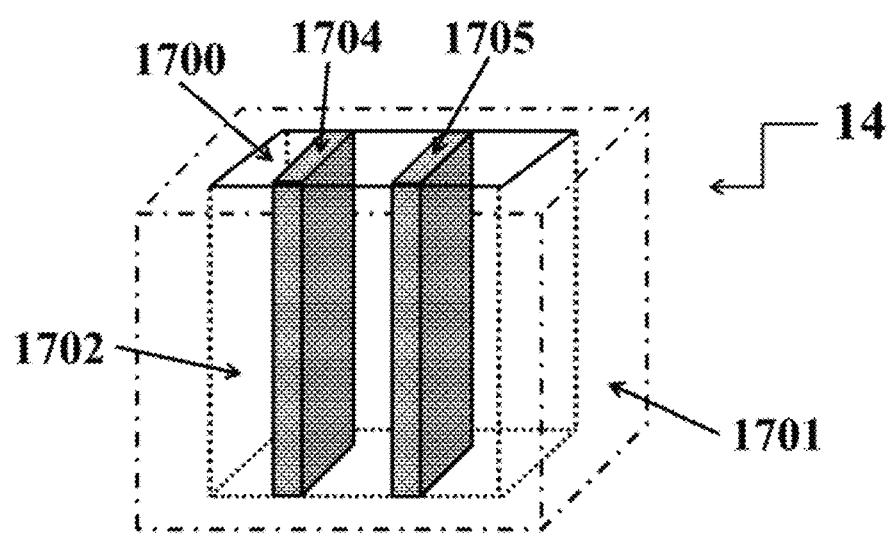
Figure 18C:
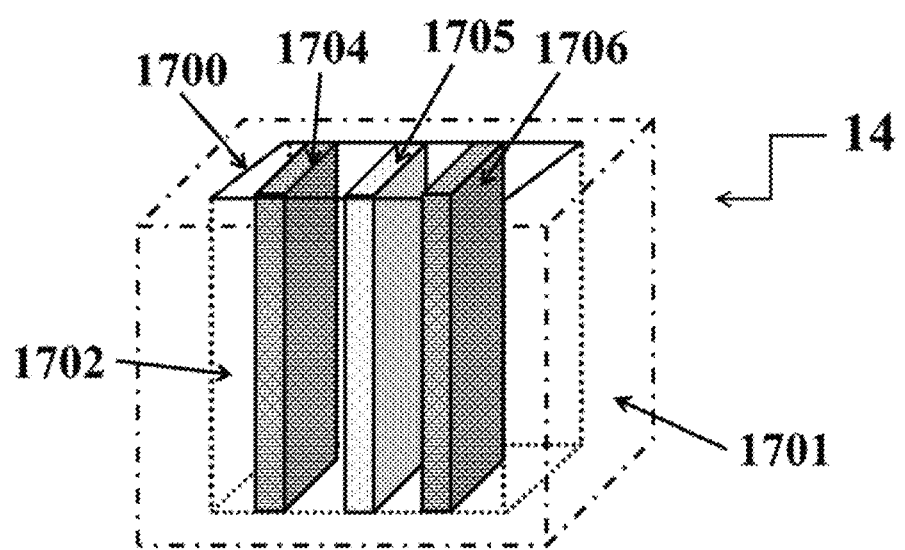
Figure 18D:
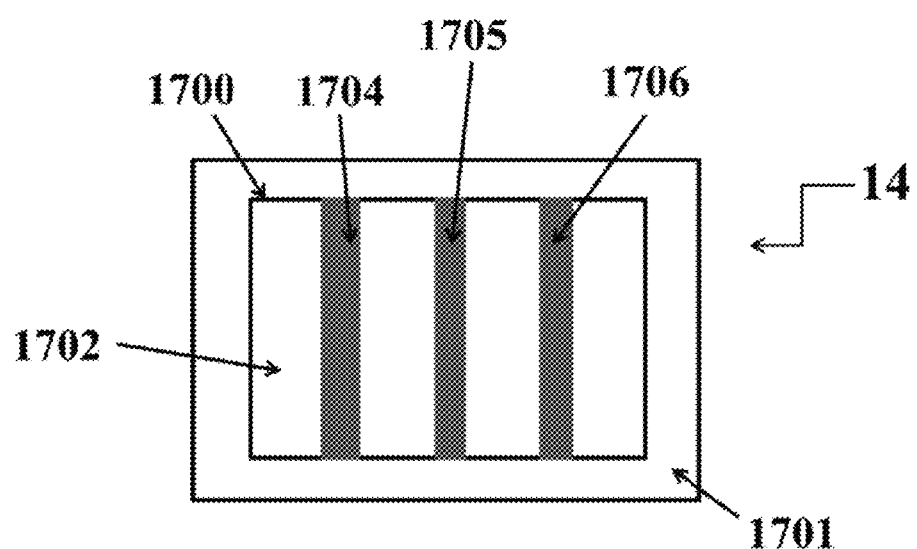

As shown in FIG. 18(a), a feedstock inlet 14 has an outer portion 1701. On the topside of the feedstock inlet 14 is an opening 1700. Inside the feedstock inlet 14 is a choke 1703. FIG. 18(b) shows another design related to a choke, where there are two sheets 1704, 1705. FIG. 18(c) shows another design related to a choke, where there are three sheets 1704, 1705 and 1706. FIG. 18(d) is the top view of the FIG. 18(c) embodiment.

Figure 19:
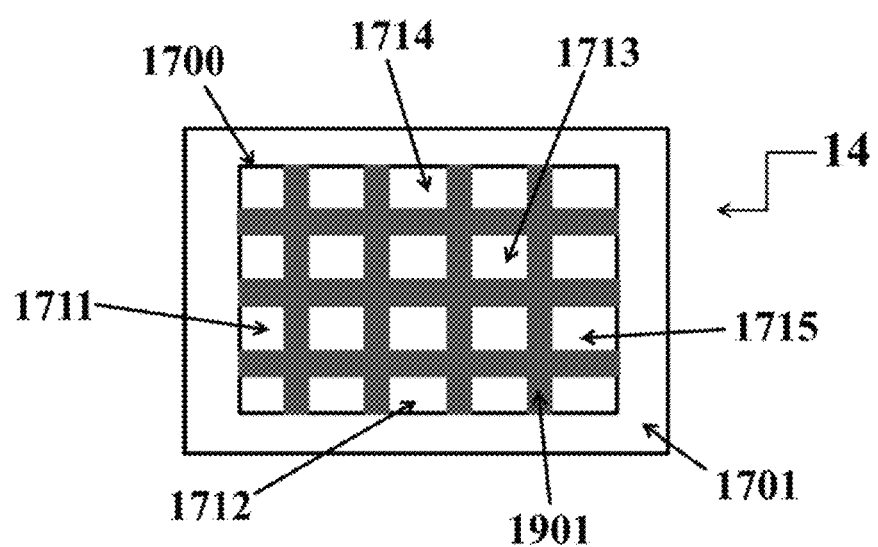
FIG. 19 show one kind of feedstock inlet used in some embodiments of the present invention.

Alternatively, the present invention provides a grill-typed choke 1901 as shown in FIG. 19.

The design key of a choke used in any embodiments of the present invention is to reduce or prevent the leakage of microwave energy.

Figure 20A:
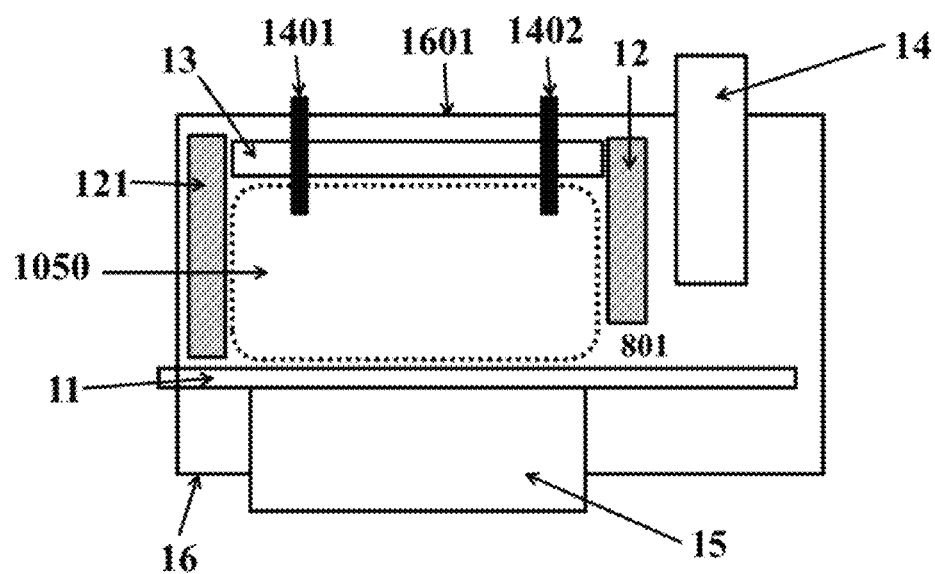
FIGS. 20(*a*) and 20(*b*) show some kinds of feedstock inlet used in some embodiments of the present invention.
Figure 20B:
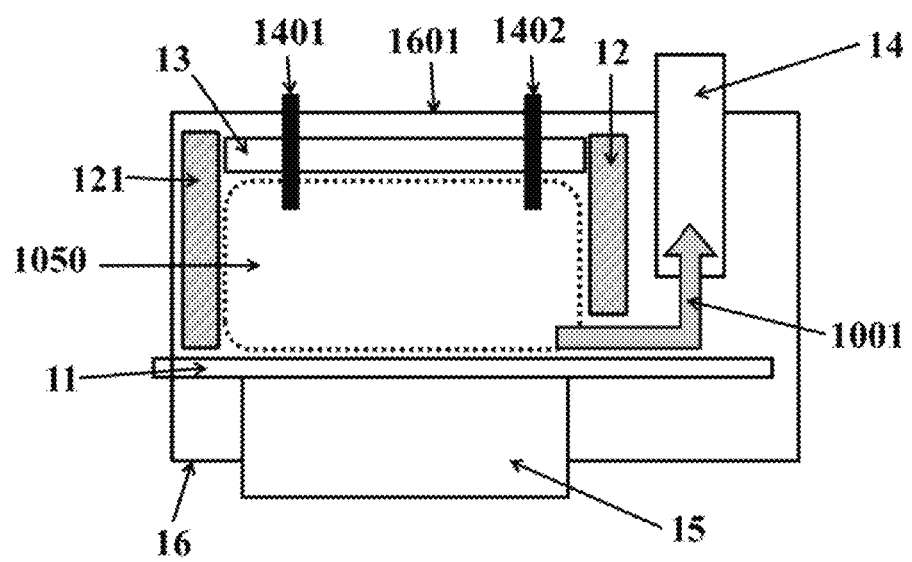

FIGS. 20(a) and 20(b) illustrates the path of microwave energy leakage. As shown in FIG. 20(a), there is a gap 801 under a first baffle plate 12. The microwave could leak through the gap 801 to the feedstock inlet 14. As shown in FIG. 20(b), microwave follows a path to enter the feedstock inlet 14, where the path is expressed as an arrow 1001.

To prevent such leakage illustrated in FIGS. 20(a) and 20(b), a feedstock inlet 14 needs a choke to keep microwave energy from leaving the pyrolysis sector 1050.

Figure 21A:
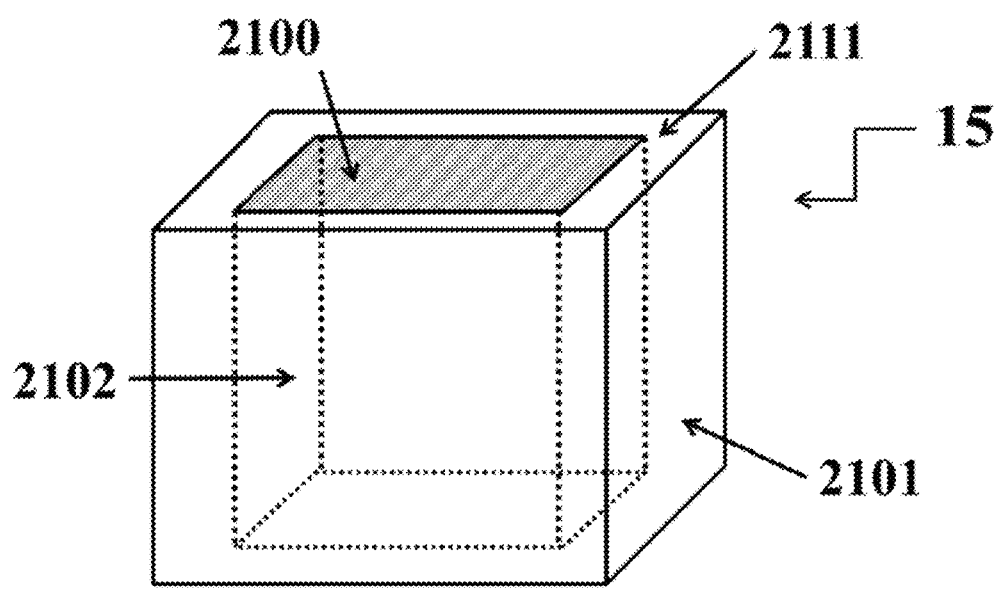
FIGS. 21(*a*), 21(*b*) and 21(*c*) show some kinds of microwave inlet used in some embodiments of the present invention.

The present invention also provides more details about a microwave inlet 15. As shown in FIG. 21(a), a microwave inlet 15 has an outer portion 2101. The top surface 2111 of the microwave inlet 15 could be attached to the microwave-transparent rotating window 11, as shown in FIG. 21(c). The top surface 2111 of the microwave inlet 15 could be unattached to but under the microwave-transparent rotating window 11. On the top surface 2111 is an opening 2100 as shown in FIG. 21(a). Alternatively, there is no opening on the top surface 2111 as shown in FIG. 21(b).

Figure 21B:
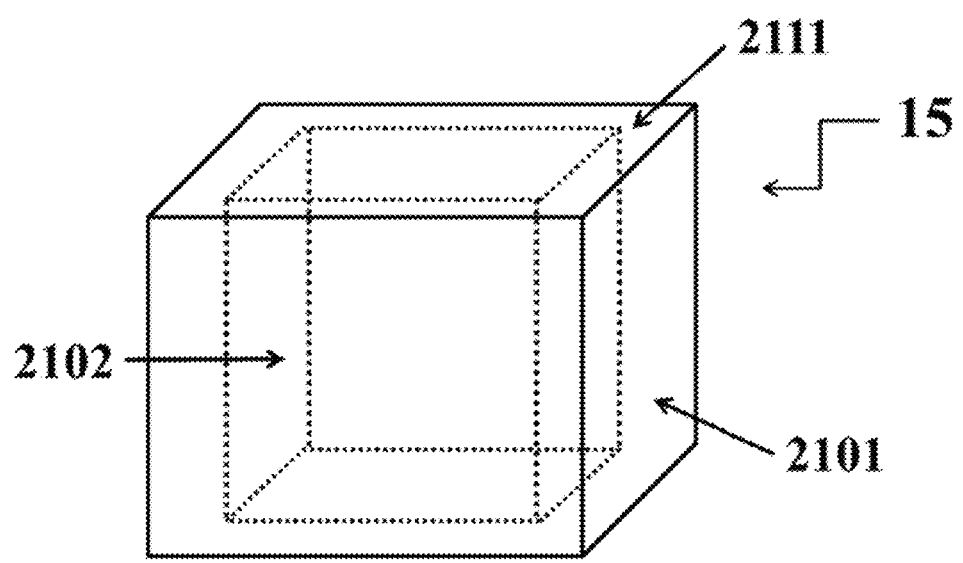
Figure 21C:
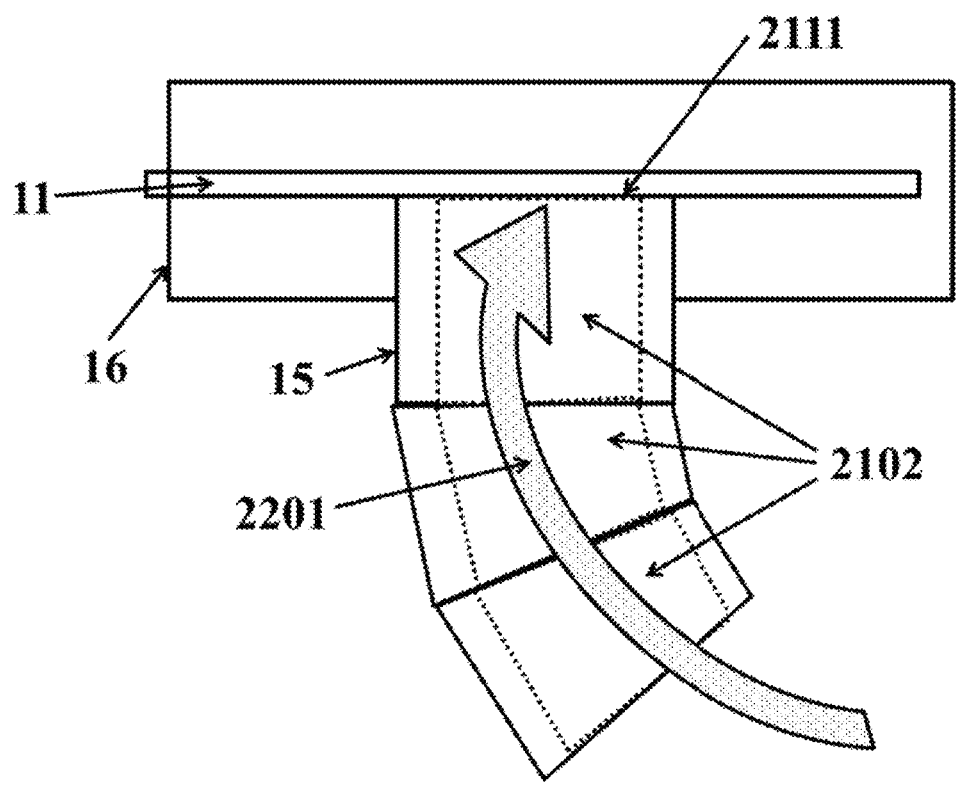

As shown in FIGS. 21(a) and 21(b), a microwave inlet 15 has a tunnel 2102 (expressed as a dashed line) that is used for a path of transmitting microwave energy. One end of the tunnel 2102 is adjacent to a microwave-transparent rotating window 11, as shown in FIG. 21(c).

The present invention also provides more details about a microwave inlet 15. FIG. 21(c) shows that a tunnel 2102 of a microwave inlet 15 extends from the bottom of a microwave-transparent rotating window 11 and further from a chamber 16. Microwave energy follows a path expressed as an arrow 2201 to enter a chamber 16. The arrow 2201 shows that microwave energy can upward transmit into the chamber 16 through microwave inlet 15.

There might be an embodiment where the microwaves are fed from the top of the pyrolysis sector, but also the gas was extracted from this side, meaning that there would always be a problem with vapours contaminating the waveguides and their quartz windows, leading to power being absorbed and heating up the windows to a point where they would be broken. Furthermore, the "top" design inhibits gas extraction from the point where most of the gas was created (above the region of highest power density).

On the other hand, the solution provided by the present invention is to introduce the microwaves underneath the microwave-transparent rotating window, from the bottom of the pyrolysis sector. In this way, the microwave-transparent rotating window would act as the window, and we extract the produced wet pyrolysis gas right above the region where they are generated.

Figure 22:
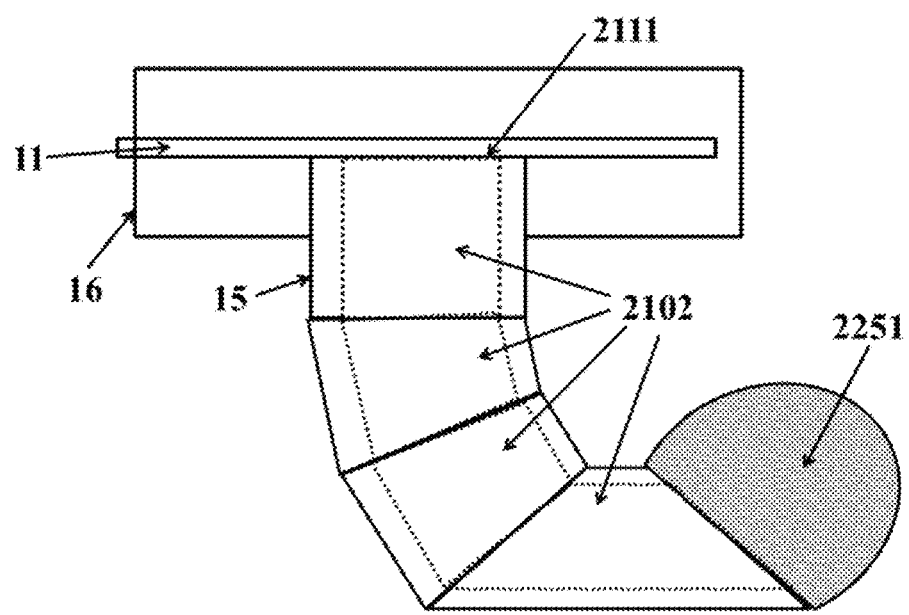
FIG. 22 shows some kinds of microwave generator used in some embodiments of the present invention.

In any embodiment of the present invention, a microwave inlet 15 may further connect a microwave generator 2251 as shown in FIG. 22. The microwave generator 2251 may be a part of a microwave pyrolysis system of the present invention.

Figure 23A:
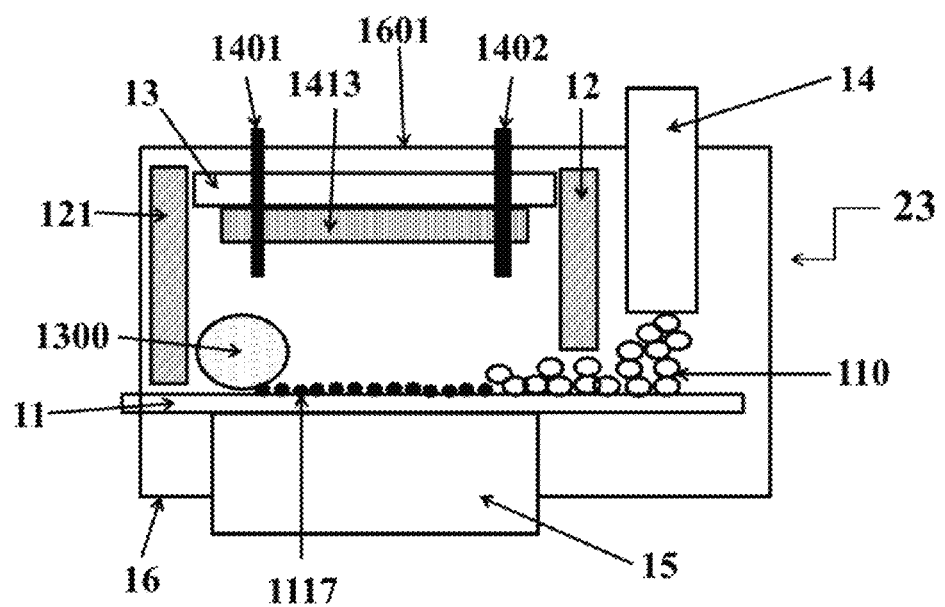
FIGS. 23(*a*) and 23(*b*) show some kinds of extractor used in some embodiments of the present invention.
Figure 23B:
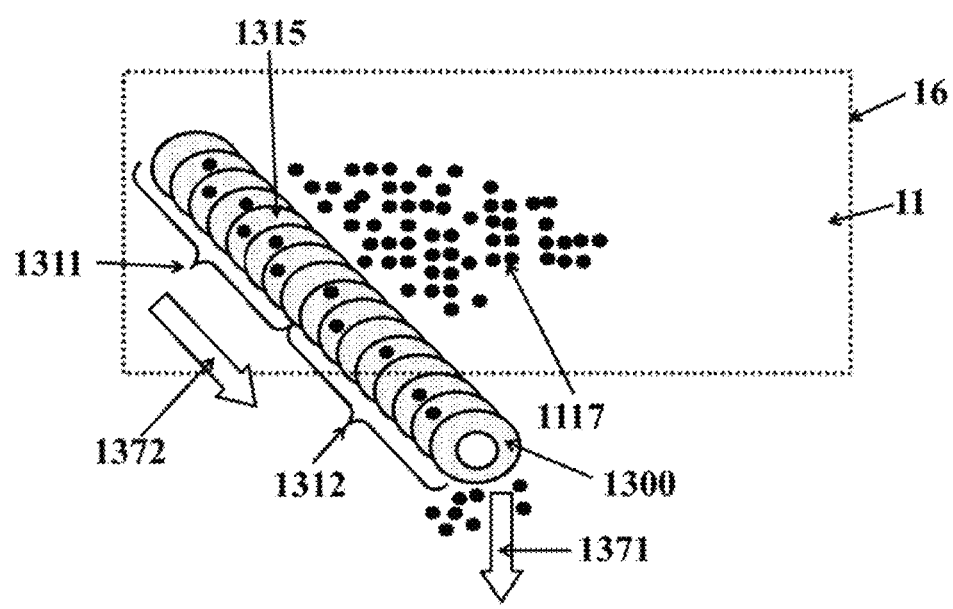

Chars 1117 (dry-end product) may be removed from the chamber 16 through a dry-end product outlet by different collecting mechanisms. In one embodiment, the dry-end product outlet is connected to the chamber 16 for collecting pyrolyzed dry-end product (Chars 1117) from the microwave-transparent rotating window by an extractor 1300, as shown in FIGS. 23(a) and 23(b). An extractor 1300 is used to move solid objects like chars 1117.

As shown in FIG. 23(a), an extractor 1300 could be located next to a second baffle plate 121. An extractor 1300 may be located near a microwave pyrolysis sector 1050. But, an extractor 1300 may not be disposed between a first baffle plate 12 and a microwave pyrolysis sector 1050.

The present invention also provides more details about an extractor 1300. As shown in FIG. 23(b), an extractor 1300 is divided into two sections. One section 1311 is located inside the chamber 16, and the other section 1312 is located outside the chamber 16.

The operation of an extractor 1300 is described as follows. Please refer to FIG. 23(b). Once chars 1117 reach the extractor 1300, the chars 1117 begin to be removed from the chamber 16. The removal of the chars 111 begins by letting the chars 1117 enter into screws 1315 of the first section 1311 of the extractor 1300. Then, the chars 1117 are conveyed by the screws 1315 and moved into the second section 1312. The direction of the movement is expressed as an arrow 1372.

Please refer to FIG. 23(b) again. Once chars 1117 reach the end of the second section 1312, the chars 1117 begin to drop out of the extractor 1300. The direction of the dropping movement is expressed as an arrow 1371.

Through an extractor 1300, chars 1117 can be removed from the chamber 16. However, it should be noted that an extractor 1300 is optional. Other particle-removing technology can be used to remove chars 111 from the chamber 16.

The microwave-assisted flash pyrolysis system of the present invention could have more than one microwave-assisted flash pyrolysis sectors. Please refer to FIG. 24 that shows one industrial scale of microwave-assisted flash pyrolysis system 24. The microwave-assisted flash pyrolysis system 24 comprises a microwave-transparent rotating window 2401, a first baffle plate 2402, a second baffle plate 2403, a tuning plate 2404, a feedstock inlet 2405, a microwave inlet 2406 and a chamber 2407. In addition, a microwave flash pyrolysis sector for the system 24 is above the microwave inlet 2406.

Please refer to FIG. 24 again. A microwave-assisted flash pyrolysis system 24 may also have an extractor 2408.

FIG. 24 provides a microwave-transparent rotating window type of a microwave-assisted flash pyrolysis system of the present invention. For that type of microwave-assisted flash pyrolysis system, a shaft 2409 is needed to be attached to a microwave-transparent rotating window 2401. When the shaft 2409 is rotating, the microwave-transparent rotating window 2401 is rotating.

Figure 25:
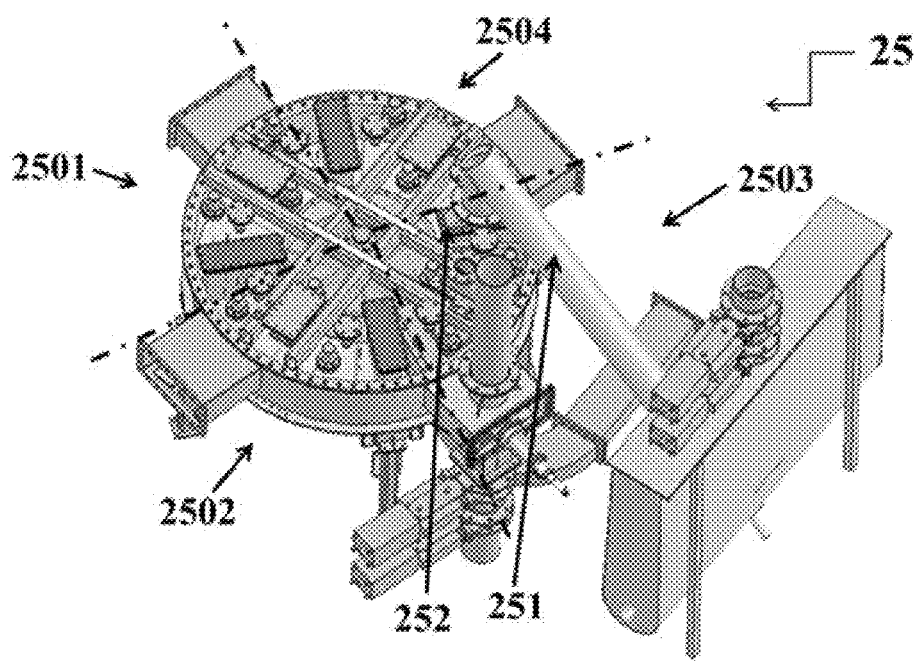
FIG. 25 shows one embodiment of the present invention.

The present invention provides another embodiment 25 of a microwave-assisted flash pyrolysis system 25 as shown in FIG. 25. Four dash-dot lines define four sectors 2501, 2502, 2503 and 2504 of the microwave-assisted flash pyrolysis system 25. The system 25 has one biomass conveyor 251 for transporting biomass objects to the system 25. And, the feedstock objects will be injected into a feedstock inlet 252 that is part of the system 25. Furthermore, in each sector 2501 (or, 2502, 2503, 2504), the layout of those basic elements of a microwave-assisted flash pyrolysis system can be the same as, or similar to, what is described above in accord with FIGS. 1-24.

The present invention also provides another embodiment as shown in FIG. 26. A microwave-assisted flash pyrolysis system 26 has four biomass conveyors 2601, 2602, 2603 and 2604. As shown in FIG. 26, four dash-dot lines define four sectors 2611, 2612, 2613 and 2614 of the microwave-assisted flash pyrolysis system 26. In each sector 2611 (or, 2612, 2613, 2614), the layout of those basic elements of a microwave-assisted flash pyrolysis system can be the same as, or similar to, what is described above in accord with FIGS. 1-24.

Finally, the present invention provides a method for flash-pyrolyzing a feedstock by using a microwave assisted pyrolysis system as mentioned above. The method comprises:

(a) introducing a feedstock through a feedstock inlet into a chamber;

(b) letting a microwave-transparent rotating window to move the feedstock through a gap into a pyrolysis sector; wherein said gap is disposed between the first baffle plate and microwave-transparent rotating window;

(c) pyrolyzing the feedstock by an upward direction of microwave energy through the microwave-transparent rotating window coming from a microwave inlet, wherein a wet pyrolysis gas and a pyrolyzed dry-end product will be produced by a flash pyrolysis process;

(d) collecting the wet pyrolysis gas by a gas collection unit through a wet gas outlet; and (e) transporting the pyrolyzed dry-end product to a dry-end product outlet; wherein the pyrolyzed dry-end product is transported out of the chamber.

The relevant statements about steps (a)-(e) have been mentioned above when the description is talking about how one corresponding part of the microwave-assisted flash pyrolysis system of the present invention is operating.

The advantage of the present invention is that because a microwave inlet is disposed below a microwave-transparent rotating window and the microwaves is transmitted through the bottom side of the microwave-transparent rotating window, a better microwave energy zone can be well formed above the microwave-transparent rotating window. A more concentrated and better microwave energy zone can provide more powerful microwave energy, so the microwave assisted flash pyrolysis can be well carried out in the present invention.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

We claim:

1. A microwave-assisted flash pyrolysis system, comprising:
    at least one microwave generator connected to a chamber;
    wherein the chamber comprises: at least one feedstock inlet, at least one first baffle plate, a microwave-transparent rotating window, and at least one microwave inlet, at least one wet gas outlet, and at least one dry-end product outlet;
    wherein the feedstock inlet for introducing feedstocks to the microwave-transparent rotating window is disposed over the microwave-transparent rotating window and in front of the first baffle plate;
    wherein the first baffle plate is used for leveling out the feedstocks on the microwave-transparent rotating window and separating the chamber with at least one pyrolysis sector in which flash pyrolysis is to take place;
    wherein the first baffle plate is disposed over the microwave-transparent rotating window, and a gap between the first baffle plate and the microwave-transparent rotating window is adjustable and used for determining the thickness of input feedstocks;
    wherein the microwave-transparent rotating window carries the input feedstocks through the gap and into the at least one pyrolysis sector;
    wherein the at least one pyrolysis sector is disposed over the microwave inlet;
    wherein the microwave inlet is connected to the microwave generator for introducing microwave energy upward into the at least one pyrolysis sector that is disposed over the microwave-transparent rotating window and limiting the microwave energy between the first baffle plate and the dry-end product outlet;
    wherein the wet gas outlet is connected to a gas collection unit for collecting wet gas from the at least one pyrolysis sector, and the wet gas outlet is disposed over the microwave-transparent rotating window; and
    wherein the dry-end product outlet is connected to the chamber for collecting pyrolyzed dry-end products from the microwave-transparent rotating window.

2. The microwave-assisted flash pyrolysis system as claimed in claim 1, wherein the microwave-transparent rotating window comprises one layer or more than one layers of different materials.

3. The microwave-assisted flash pyrolysis system as claimed in claim 2, further comprising a shaft, wherein the shaft is disposed on a center of the microwave-transparent rotating window.

4. The microwave-assisted flash pyrolysis system as claimed in claim 1, further comprising a rotating mechanism, wherein the rotating mechanism enables the microwave-transparent rotating window to rotate.

5. The microwave-assisted flash pyrolysis system as claimed in claim 1, further comprising a microwave-transparent plate that is resistant to thermal shock; wherein the microwave-transparent plate is disposed on the microwave-transparent rotating window.

6. The microwave-assisted flash pyrolysis system as claimed in claim 1, further comprising a second baffle plate for further defining the at least one pyrolysis sector together with the first baffle plate; wherein the second baffle plate is disposed over the microwave-transparent rotating window.

7. The microwave-assisted flash pyrolysis system as claimed in claim 6, wherein the first baffle plate and second baffle plate further comprise at least one gas nozzle for introducing inert gases.

8. The microwave-assisted flash pyrolysis system as claimed in claim 1, further comprising a tuning plate and an adjusting mechanism that is automatically or manually operated; wherein the tuning plate is connected to the adjusting mechanism and is disposed between the microwave-transparent rotating window and the wet gas outlet; wherein the tuning plate is used for optimizing the at least one pyrolysis sector and for securing maximum microwave energy to enter the input feedstocks and to be absorbed by the input feedstocks; wherein the tuning plate is used to minimize reflected power to microwave magnetron and to keep maximum energy efficiency in the at least one pyrolysis sector.

9. The microwave-assisted flash pyrolysis system as claimed in claim 8, further comprising a catalytic mesh for further cracking chemical bonds and for separating chemical binding components in wet pyrolysis gas; wherein the catalytic mesh is located on, fastened to, or located underneath, the tuning plate, and above the microwave-transparent rotating window.

10. The microwave-assisted flash pyrolysis system as claimed in claim 1, further comprising a gas flow system for controlling gas flows and a cooling system for controlling a temperature of the chamber.

11. The microwave-assisted flash pyrolysis system as claimed in claim 1, wherein the atmosphere inside the chamber consists of an inert atmosphere, and where oxygen is kept out and no oxygen is added to the chamber.

12. A method for flash-pyrolyzing a feedstock by using a microwave assisted pyrolysis system as claimed in claim 1, comprising:
    introducing the feedstock through the feedstock inlet into the chamber;
    rotating the microwave-transparent rotating window to move the feedstock through the gap into the at least one pyrolysis sector; wherein said gap is disposed between the first baffle plate and the microwave-transparent rotating window;
    pyrolyzing the feedstock by an upward direction of microwave energy through the microwave-transparent rotating window coming from the microwave inlet, wherein the wet gas and the pyrolyzed dry-end product will be produced by a flash pyrolysis process;
    collecting the wet gas by the gas collection unit through the wet gas outlet; and transporting the pyrolyzed dry-end product to the dry-end product outlet;
wherein the pyrolyzed dry-end product is transported out of the chamber.

* * * * *